United States Patent
Zhu et al.

(10) Patent No.: US 11,974,124 B2
(45) Date of Patent: Apr. 30, 2024

(54) METHOD FOR IDENTIFYING TERMINAL DEVICE AND COMMUNICATIONS APPARATUS

(71) Applicant: Huawei Technologies Co., Ltd., Shenzhen (CN)

(72) Inventors: Haoren Zhu, Shanghai (CN); Gang Li, Shanghai (CN); Weisheng Jin, Shanghai (CN); Yang Xin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 227 days.

(21) Appl. No.: 17/187,290

(22) Filed: Feb. 26, 2021

(65) Prior Publication Data

US 2021/0185528 A1     Jun. 17, 2021

Related U.S. Application Data

(63) Continuation of application No. PCT/CN2019/100564, filed on Aug. 14, 2019.

(30) Foreign Application Priority Data

Aug. 27, 2018   (CN) .......................... 201810982629.9

(51) Int. Cl.
*H04W 36/08* (2009.01)
*H04W 8/24* (2009.01)
(Continued)

(52) U.S. Cl.
CPC ............. *H04W 12/06* (2013.01); *H04W 8/24* (2013.01)

(58) Field of Classification Search
None
See application file for complete search history.

(56) References Cited

U.S. PATENT DOCUMENTS

| 2016/0292696 A1 | 10/2016 | Gong et al. |
| 2017/0092138 A1 | 3/2017 | Trundle et al. |
| 2018/0324662 A1* | 11/2018 | Phuyal .................. H04W 48/18 |

FOREIGN PATENT DOCUMENTS

| CN | 106197424 A | 12/2016 |
| CN | 106354153 A | 1/2017 |

(Continued)

OTHER PUBLICATIONS

"3rd Generation Partnership Project; Technical Specification Group Radio Access Network; Study on Enhanced LTE Support for Aerial Vehicles (Release 15)," 3GPP TR 36.777 V15.0.0, total 142 pages, 3rd Generation Partnership Project, Valbonne, France (Dec. 2017).

(Continued)

*Primary Examiner* — Gary Lafontant
(74) *Attorney, Agent, or Firm* — Leydig, Voit & Mayer, Ltd.

(57) ABSTRACT

This application provides a method for identifying a terminal device and a communications apparatus. A core network element obtains classification information for classifying a terminal device, and then determines, based on the classification information and a parameter of a first terminal device, a type of the first terminal device, to identify the first terminal device. In this process, the core network element identifies the first terminal device in a supervision area by using the classification information and the parameter of the first terminal device, to identify a terminal device that is not registered in a supervision system, thereby improving security of the terminal device.

18 Claims, 22 Drawing Sheets

(51) Int. Cl.
*H04W 12/06* (2021.01)
*H04W 36/30* (2009.01)

(56) References Cited

FOREIGN PATENT DOCUMENTS

| | | | |
|---|---|---|---|
| CN | 106448271 | A | 2/2017 |
| CN | 106507276 | A | 3/2017 |
| CN | 106877947 | A | 6/2017 |
| CN | 108073181 | A | 5/2018 |
| WO | 2016154949 | A1 | 10/2016 |
| WO | 2018071442 | A1 | 4/2018 |

OTHER PUBLICATIONS

"3rd Generation Partnership Project; Technical Specification Group Services and System Aspects; Study of Enablers for Network Automation for 5G (Release 16)," 3GPP TR 23.791 V0.5.0, total 48 pages, 3rd Generation Partnership Project, Valbonne, France (Jul. 2018).

Orange, "New use case for detection and management of a rogue Uas," 3GPP TSG-SA WG1 Meeting #83, West Palm Beach, Florida, US, S1-182092, total 2 pages, 3rd Generation Partnership Project, Valbonne, France (Aug. 20-24, 2018).

Huawei, Orange , China Unicom, "ID_UAS—Use case of UAV type identification," 3GPP TSG-SA WG1 Meeting #83, West Palm Beach, S1-182732, total 2 pages, 3rd Generation Partnership Project, Valbonne, France (Aug. 20-24, 2018).

"3rd Generation Partnership Project; Technical Specification Group Services and System Aspects; Remote Identification of Unmanned Aerial Systems; Stage 1 (Release 16)," 3GPP TR 22.8de V0.1.0, S1-181302, total 12 pages, 3rd Generation Partnership Project, Valbonne, France (May 2018).

"3rd Generation Partnership Project; Technical Specification Group Radio Access Network; Study on Enhanced LTE Support for Aerial Vehicles (Release 15)," 3GPP TR 36.777 V0.3.1, total 24 pages, 3rd Generation Partnership Project, Valbonne, France (Oct. 2017).

* cited by examiner

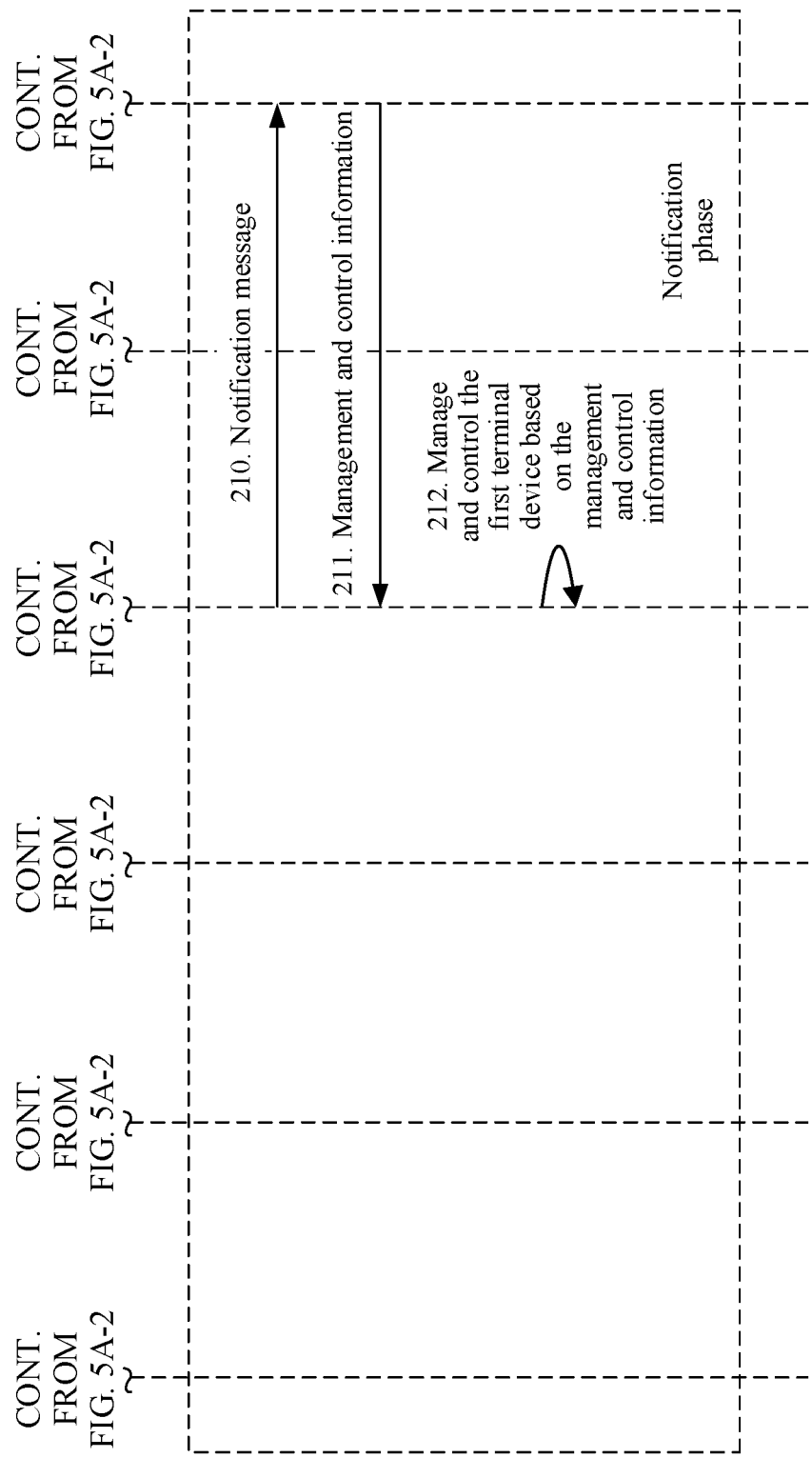

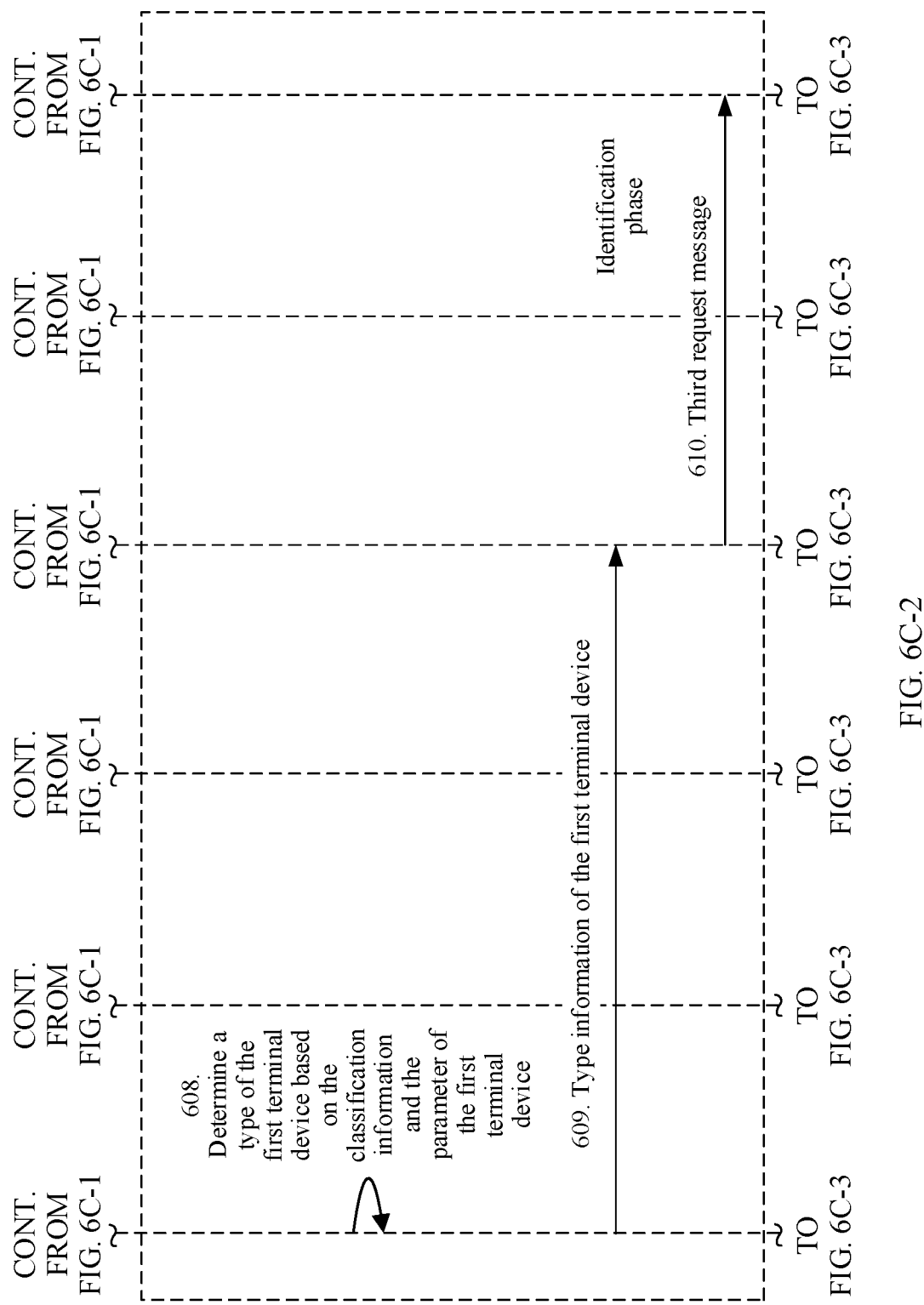

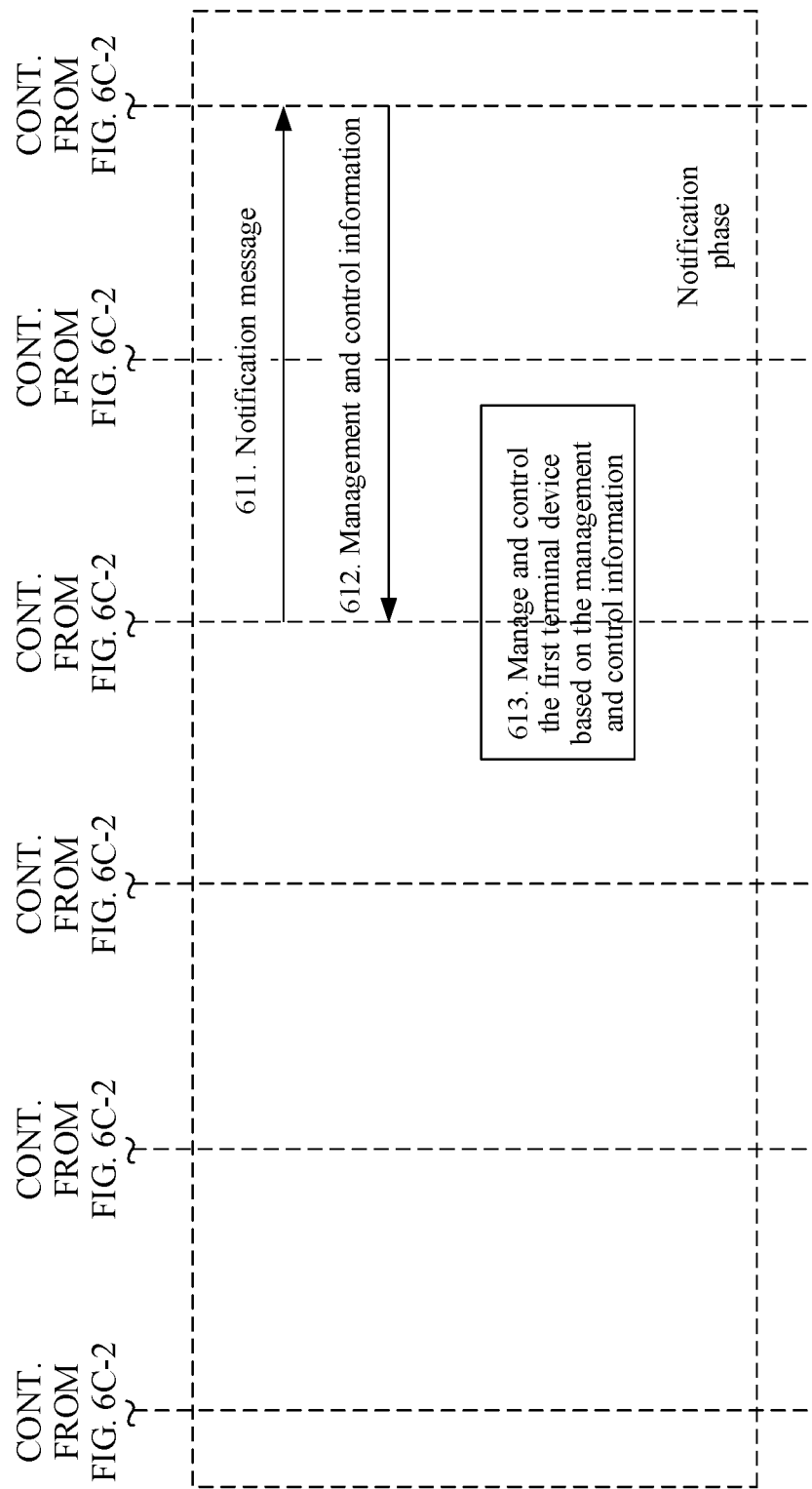

METHOD FOR IDENTIFYING TERMINAL DEVICE AND COMMUNICATIONS APPARATUS

CROSS-REFERENCE TO RELATED APPLICATIONS

This application is a continuation of International Application No. PCT/CN2019/100564, filed on Aug. 14, 2019, which claims priority to Chinese Patent Application No. 201810982629.9, filed on Aug. 27, 2018. The disclosure of the aforementioned applications are hereby incorporated by reference in their entireties.

TECHNICAL FIELD

This application relates to the field of communications technologies, and in particular, to a method for identifying a terminal device and a communications apparatus.

BACKGROUND

With development of electronic technologies, unmanned aerial vehicles are widely used in commercial and civil consumer markets, for example, in aerial photography, news reporting, and express delivery service. To manage the unmanned aerial vehicles and enable the unmanned aerial vehicles to be better used in many fields, an unmanned aerial vehicle identification technology is particularly important.

In the conventional technology, an unmanned aerial vehicle is identified by using a supervision system. Specifically, a unique identity of an authorized unmanned aerial vehicle is pre-stored in the supervision system, and the unique identity is, for example, information on a subscriber identity module (SIM) card of the unmanned aerial vehicle. During supervision, the unmanned aerial vehicle reports the unique identity of the unmanned aerial vehicle to the supervision system. After receiving the unique identity, the supervision system identifies the unmanned aerial vehicle corresponding to the unique identity, and then performs a series of control on the identified unmanned aerial vehicle. The supervision system may be deployed on a third-party application server. The third-party application server is, for example, a drone cloud deployed on a data network (DN). The drone cloud has an unmanned monitoring and management (UMM) function. The drone cloud stores a unique identity of an authorized unmanned aerial vehicle, and a management and control measures corresponding to the identity. The drone cloud may be deployed as a network element in the DN, and is referred to as a UMM network element.

Currently, the unmanned aerial vehicle identification methods are only applicable to identification of cooperative/authorized unmanned aerial vehicles. However, an unauthorized unmanned aerial vehicle or an unauthorized aircraft may not use a dedicated SIM card or may bypass various supervision measures. In this case, the supervision system cannot perform identification, resulting in serious security vulnerabilities.

SUMMARY

This application provides a method for identifying a terminal device and a communications apparatus, to identify an unauthorized unmanned aerial vehicle.

According to a first aspect, an embodiment of this application provides a method for identifying a terminal device. The method may be used by a core network element, or may be used by a chip in a core network element. The following describes the method by using an example in which the method is used by the core network element. The method includes:

obtaining, by the core network element, classification information, where the classification information is for classifying a terminal device; and determining, by the core network element based on a parameter of a first terminal device and the classification information, a type of the first terminal device.

According to the method for identifying a terminal device provided in the first aspect, the core network element obtains the classification information for classifying the terminal device, and then determines, based on the classification information and the parameter of the first terminal device, the type of the first terminal device, to identify the first terminal device. In this process, the core network element identifies the first terminal device in a supervision area by using the classification information and the parameter of the first terminal device, to identify a terminal device that is not registered in a supervision system, thereby improving security of the terminal device.

In a feasible implementation, the method further includes:

sending, by the core network element, a first request message to a network data analysis network element, where the first request message requests the classification information; and receiving, by the core network element, the classification information sent by the network data analysis network element.

According to the method for identifying a terminal device provided in the possible implementation, the core network element sends the first request message to the network data analysis network element, to obtain the classification information from the network data analysis network element, and the core network element identifies the first terminal device by using the classification information provided by the network data analysis network element. In this way, a terminal device that is not registered in a supervision system can be identified, thereby improving security of using the terminal device.

In a feasible implementation, the method further includes:

receiving, by the core network element, a second request message sent by a third-party network element, where the second request message requests the type of the first terminal device; and sending, by the core network element, a response message to the third-party network element, where the response message includes type information of the first terminal device.

According to the method for identifying a terminal device provided in the possible implementation, the third-party network element sends the second request message to the core network element, to trigger the core network element to identify the first terminal device. In this process, the core network element may be flexibly triggered, based on a requirement of the third-party network element, to identify the first terminal device. The third-party network element may carry related information of the first terminal device in the second request message and send the second request message to the core network element, to further flexibly trigger, based on the requirement of the third-party network element, the core network element to identify the first terminal device.

In a feasible implementation, the second request message includes one or more of the following information: identification information of the first terminal device, supervision area information, and an identification precision requirement.

According to the method for identifying a terminal device provided in the possible implementation, the identification information of the first terminal device, the supervision area information, and the identification precision requirement are carried in the second request message and sent to the core network element, so that the core network element identifies the terminal device based on a requirement of the third-party network element, thereby achieving an objective of identifying the terminal device based on a requirement.

In a feasible implementation, the first request message includes one or more of the following information: the identification precision requirement, a training data source, a training data type, and a training model type.

According to the method for identifying a terminal device provided in this possible implementation, the core network element sends information related to the classification information, for example, the identification precision requirement, the training data source, the training data type, and the training model type, to the network data analysis network element by using the first request message, so that the network data analysis network element obtains classification data based on a requirement, to meet a requirement of flexibly obtaining the classification information in a process for identifying the terminal device.

In a feasible implementation, the method further includes:
obtaining, by the core network element, the parameter of the first terminal device.

According to the method for identifying a terminal device provided in the possible implementation, the parameter of the first terminal device is obtained.

In a feasible implementation, the obtaining, by the core network element, the parameter of the first terminal device includes:
receiving, by the core network element, the parameter of the first terminal device that is sent by a network side network element; or
receiving, by the core network element, the parameter of the first terminal device that is sent by the third-party network element.

According to the method for identifying a terminal device provided in the possible implementation, the parameter of the first terminal device is flexibly obtained.

In a feasible implementation, the parameter of the first terminal device that is sent by the network side network element includes at least one of a quantity of detected cells, a distance between a detected cell and a serving cell, a handover delay, a handover frequency, a handover success rate, a reference signal received power RSRP, reference signal received quality RSRQ, a signal to interference plus noise ratio SINR, or an uplink transmit power; and the parameter of the first terminal device that is sent by the third-party network element includes a transmission feature and/or service feature data.

According to the method for identifying a terminal device provided in the possible implementation, the parameter of the first terminal device is flexibly obtained.

In a feasible implementation, the classification information is for classifying the terminal device into an authorized terminal device or an unauthorized terminal device.

According to the method for identifying a terminal device provided in the possible implementation, the first terminal device of an unknown type is classified as the authorized terminal device or the unauthorized terminal device.

In a feasible implementation, the classification information is for classifying the terminal device into a ground terminal device or an air terminal device.

According to the method for identifying a terminal device provided in the possible implementation, the first terminal device of an unknown type is classified as the ground terminal device or the air terminal device.

In a feasible implementation, if the core network element determines that the first terminal device is the air terminal device, the method further includes:
sending, by the core network element, a third request message to a unified data management (UDM) network element or the third-party network element, where the third request message is used to verify whether the first terminal device is the unauthorized terminal device.

According to the method for identifying a terminal device provided in the possible implementation, when determining that the first terminal device is the air terminal device, the core network element further sends the third request message to the third-party network element or the UDM network element, to verify whether the first terminal device is the unauthorized terminal device, thereby identifying the first terminal device.

In a feasible implementation, the core network element is an assisted unmanned management function (AUMF) network element, a policy control function (PCF) network element, an unmanned monitoring and management function UMM network element, or a network exposure function (NEF) network element.

According to the method for identifying a terminal device provided in the possible implementation, a function for identifying the terminal device can be flexibly deployed on any network element.

In a feasible implementation, when the first terminal device is the unauthorized terminal device, the method further includes:
sending, by the core network element, a notification message to the third-party network element, where the notification message is used to indicate to the third-party network element that the first terminal device is the unauthorized terminal device.

According to the method for identifying a terminal device provided in the possible implementation, after identifying that the first terminal device is the unauthorized terminal device, the core network element further manages and controls the unauthorized terminal device based on management and control information of the third-party network element. In this process, the unauthorized terminal device is controlled to reduce a threat caused by the unauthorized terminal device to security.

According to a second aspect, an embodiment of this application provides a method for identifying a terminal device. The method may be used by a network data analysis network element, or may be used by a chip in a network data analysis network element. The following describes the method by using an example in which the method is used by the network data analysis network element. The method includes:
receiving, by the network data analysis network element, a first request message sent by a core network element, where the first request message requests classification information, and the classification information is for classifying a terminal device; and
sending, by the network data analysis network element, the classification information to the core network element.

According to the method for identifying a terminal device provided in the second aspect, the core network element sends the first request message to the network data analysis network element, to obtain the classification information from the network data analysis network element, and the core network element identifies the first terminal device by using the classification information provided by the network data analysis network element. In this way, a terminal device that is not registered in a supervision system can be identified, thereby improving security of using the terminal device.

In a feasible implementation, the first request message includes one or more of the following information: an identification precision requirement, a training data source, a training data type, and a training model type.

According to the method for identifying a terminal device provided in this possible implementation, the core network element sends information related to the classification information, for example, the identification precision requirement, the training data source, the training data type, and the training model type, to the network data analysis network element by using the first request message, so that the network data analysis network element obtains classification data based on a requirement, to meet a requirement of flexibly obtaining the classification information in a process for identifying the terminal device.

In a feasible implementation, the classification information is for classifying the terminal device into an authorized terminal device or an unauthorized terminal device.

According to the method for identifying a terminal device provided in the possible implementation, the first terminal device of an unknown type is classified as the authorized terminal device or the unauthorized terminal device.

In a feasible implementation, the classification information is for classifying the terminal device into a ground terminal device or an air terminal device.

According to the method for identifying a terminal device provided in the possible implementation, the first terminal device of an unknown type is classified as the ground terminal device or the air terminal device.

In a feasible implementation, the core network element is an assisted unmanned management function AUMF network element, a policy control function PCF network element, an unmanned monitoring and management function UMM network element, or a network exposure function NEF network element.

According to the method for identifying a terminal device provided in the possible implementation, a function for identifying the terminal device can be flexibly deployed on any network element.

According to a third aspect, an embodiment of this application provides a communications apparatus, including:
  a processing unit, configured to obtain classification information, and determine, based on a parameter of a first terminal device and the classification information, a type of the first terminal device, where the classification information is for classifying a terminal device.

In a feasible implementation, the apparatus further includes:
  a sending unit, configured to send a first request message to a network data analysis network element, where the first request message requests the classification information; and
  a receiving unit, configured to receive the classification information sent by the network data analysis network element.

In a feasible implementation, the apparatus further includes:
  the receiving unit, further configured to receive a second request message sent by a third-party network element, where the second request message requests the type of the first terminal device; and
  the sending unit, further configured to send a response message to the third-party network element, where the response message includes type information of the first terminal device.

In a feasible implementation, the second request message includes one or more of the following information: identification information of the first terminal device, supervision area information, and an identification precision requirement.

In a feasible implementation, the first request message includes one or more of the following information: the identification precision requirement, a training data source, a training data type, and a training model type.

In a feasible implementation, the processing unit is further configured to obtain the parameter of the first terminal device.

In a feasible implementation, the processing unit is specifically configured to receive the parameter of the first terminal device that is sent by a network side network element; or
the processing unit is specifically configured to receive the parameter of the first terminal device that is sent by the third-party network element.

In a feasible implementation, the parameter of the first terminal device that is sent by the network side network element includes at least one of a quantity of detected cells, a distance between a detected cell and a serving cell, a handover delay, a handover frequency, a handover success rate, a reference signal received power (RSRP), reference signal received quality (RSRQ), a signal to interference plus noise ratio (SINR), or an uplink transmit power; and
the parameter of the first terminal device that is sent by the third-party network element includes a transmission feature and/or service feature data.

In a feasible implementation, the classification information is for classifying the terminal device into an authorized terminal device or an unauthorized terminal device.

In a feasible implementation, the classification information is for classifying the terminal device into a ground terminal device or an air terminal device.

In a feasible implementation, the apparatus further includes the sending unit, where
if the processing unit determines that the first terminal device is the air terminal device, the sending unit is configured to send a third request message to a unified data management (UDM) network element or the third-party network element, where the third request message is used to verify whether the first terminal device is the unauthorized terminal device.

In a feasible implementation, the apparatus further includes the sending unit, where
when the first terminal device is the unauthorized terminal device, the sending unit is configured to send a notification message to the third-party network element, where the notification message is used to indicate to the third-party network element that the first terminal device is the unauthorized terminal device.

For beneficial effects of the communications apparatus provided in the third aspect and the possible implementations of the third aspect, refer to beneficial effects brought by the first aspect and the possible implementations of the first aspect. Details are not described herein again.

According to a fourth aspect, an embodiment of this application provides a communications apparatus, including:

a receiving unit, configured to receive a first request message sent by a core network element, where the first request message requests classification information, and the classification information is for classifying a terminal device; and a sending unit, configured to send the classification information to the core network element.

In a feasible implementation, the first request message includes one or more of the following information: an identification precision requirement, a training data source, a training data type, and a training model type.

In a feasible implementation, the classification information is for classifying the terminal device into an authorized terminal device or an unauthorized terminal device.

In a feasible implementation, the classification information is for classifying the terminal device into a ground terminal device or an air terminal device.

For beneficial effects of the communications apparatus provided in the fourth aspect and the possible implementations of the fourth aspect, refer to beneficial effects brought by the second aspect and the possible implementations of the second aspect. Details are not described herein again.

According to a fifth aspect, an embodiment of this application provides a computer program product including an instruction. When the computer program product is run on a computer, the computer is enabled to perform the method according to any one of the first aspect or the possible implementations of the first aspect.

According to a sixth aspect, an embodiment of this application provides a computer program product including an instruction. When the computer program product is run on a computer, the computer is enabled to perform the method according to any one of the second aspect or the possible implementations of the second aspect.

According to a seventh aspect, an embodiment of this application provides a computer-readable storage medium. The computer-readable storage medium stores an instruction; and when the instruction is run on a computer, the computer is enabled to perform the method in any one of the first aspect and the possible implementations of the first aspect.

According to an eighth aspect, an embodiment of this application provides a computer-readable storage medium. The computer-readable storage medium stores an instruction; and when the instruction is run on a computer, the computer is enabled to perform the method in any one of the second aspect and the possible implementations of the second aspect.

According to the method for identifying a terminal device and the communications apparatus that are provided in the embodiments of this application, the core network element obtains the classification information for classifying the terminal device, and then determines, based on the classification information and the parameter of the first terminal device, the type of the first terminal device, to identify the first terminal device. In this process, the core network element identifies the first terminal device in the supervision area by using the classification information and the parameter of the first terminal device, to identify the terminal device that is not registered in a supervision system, thereby improving security of the terminal device.

According to a ninth aspect, an embodiment of this application provides a method for identifying a terminal device. The method may be used by an access network element, or may be used by a chip in an access network element. The following describes the method by using an example in which the method is used by the access network element. The method includes:

obtaining, by the access network element, classification information, where the classification information is for classifying a terminal device; and determining, by the access network element based on a parameter of a first terminal device and the classification information, a type of the first terminal device.

According to the method for identifying a terminal device provided in the ninth aspect, the access network element obtains the classification information for classifying the terminal device, and then determines, based on the classification information and the parameter of the first terminal device, the type of the first terminal device, to identify the first terminal device. In this process, the access network element identifies the first terminal device in a supervision area by using the classification information and the parameter of the first terminal device, to identify a terminal device that is not registered in a supervision system, thereby improving security of the terminal device.

In a feasible implementation, the method further includes:

receiving, by the access network element, a first request message sent by a core network element, where the first request message requests the classification information.

According to the method for identifying a terminal device provided in the possible implementation, the core network element sends the first request message to the access network element, so that the access network element obtains the classification information, and further identifies the first terminal device based on the classification information. In this way, the terminal device that is not registered in the supervision system can be identified, thereby improving security of using the terminal device.

In a feasible implementation, the obtaining, by the access network element, classification information includes:

receiving, by the access network element, the classification information sent by the core network element; or locally obtaining, by the access network element, the classification information.

According to the method for identifying a terminal device provided in the possible implementation, the classification information is flexibly obtained.

In a feasible implementation, the method further includes:

measuring, by the access network element, the first terminal to obtain the parameter of the first terminal device; or receiving, by the access network element, the parameter reported by the first terminal device.

According to the method for identifying a terminal device provided in the possible implementation, the parameter of the first terminal device is flexibly obtained.

In a feasible implementation, the parameter of the first terminal device includes at least one of a quantity of detected cells, a distance between a detected cell and a serving cell, a handover delay, a handover frequency, a handover success rate, a reference signal received power (RSRP), reference signal received quality (RSRQ), a signal to interference plus noise ratio (SINR), or an uplink transmit power.

According to the method for identifying a terminal device provided in the possible implementation, the parameter of the first terminal device is flexibly obtained.

According to a tenth aspect, an embodiment of this application provides a communications apparatus, including:

a processing unit, configured to obtain classification information, and determine, based on a parameter of a first terminal device and the classification information, a type of the first terminal device, where the classification information is for classifying a terminal device.

In a feasible implementation, the apparatus further includes:

a receiving unit, configured to receive a first request message sent by a core network element, where the first request message requests the type of the first terminal device.

In a feasible implementation, when obtaining the classification information, the processing unit is specifically configured to receive the classification information sent by the core network element; or when obtaining the classification information, the processing unit is specifically configured to locally obtain the classification information.

In a feasible implementation, the processing unit is further configured to measure the first terminal to obtain the parameter of the first terminal device; or the processing unit is configured to receive the parameter reported by the first terminal device.

In a feasible implementation, the parameter of the first terminal device includes at least one of a quantity of detected cells, a distance between a detected cell and a serving cell, a handover delay, a handover frequency, a handover success rate, a reference signal received power (RSRP), reference signal received quality (RSRQ), a signal to interference plus noise ratio (SINR), or an uplink transmit power.

According to an eleventh aspect, an embodiment of this application provides a computer program product including an instruction. When the computer program product is run on a computer, the computer is enabled to perform the method according to any one of the ninth aspect or the possible implementations of the ninth aspect.

According to a twelfth aspect, an embodiment of this application provides a computer-readable storage medium. The computer-readable storage medium stores an instruction; and when the instruction is run on a computer, the computer is enabled to perform the method in any one of the ninth aspect and the possible implementations of the ninth aspect.

According to the method for identifying a terminal device and the communications apparatus that are provided in the embodiments of this application, the access network element obtains the classification information for classifying the terminal device, and then determines, based on the classification information and the parameter of the first terminal device, the type of the first terminal device, to identify the first terminal device. In this process, the access network element identifies the first terminal device in a supervision area by using the classification information and the parameter of the first terminal device, to identify a terminal device that is not registered in a supervision system, thereby improving security of the terminal device.

BRIEF DESCRIPTION OF DRAWINGS

FIG. 5A-1, FIG. 5A-2, and FIG. 5A-3 are a flowchart of a method for identifying a terminal device applicable to the network architecture shown in FIG. 3 according to another embodiment of this application;

FIG. 5B-1, FIG. 5B-2, and FIG. 5B-3 are a flowchart of a method for identifying a terminal device applicable to the network architecture shown in FIG. 3 according to another embodiment of this application;

FIG. 6B-1, FIG. 6B-2, and FIG. 6B-3 are a flowchart of a method for identifying a terminal device applicable to the network architecture shown in FIG. 3 according to still another embodiment of this application;

FIG. 6C-1, FIG. 6C-2, and FIG. 6C-3 are a flowchart of a method for identifying a terminal device applicable to the network architecture shown in FIG. 3 according to an embodiment of this application;

DESCRIPTION OF EMBODIMENTS

The method for identifying a terminal device described in this application may be used in a 4th generation (4G) mobile communications system, a long term evolution-advanced (LTE-A) system, a cellular system related to the 3rd Generation Partnership Project (3GPP), a 5th generation (5G) mobile communications system, and a subsequent evolved communications system.

Figure 1A:
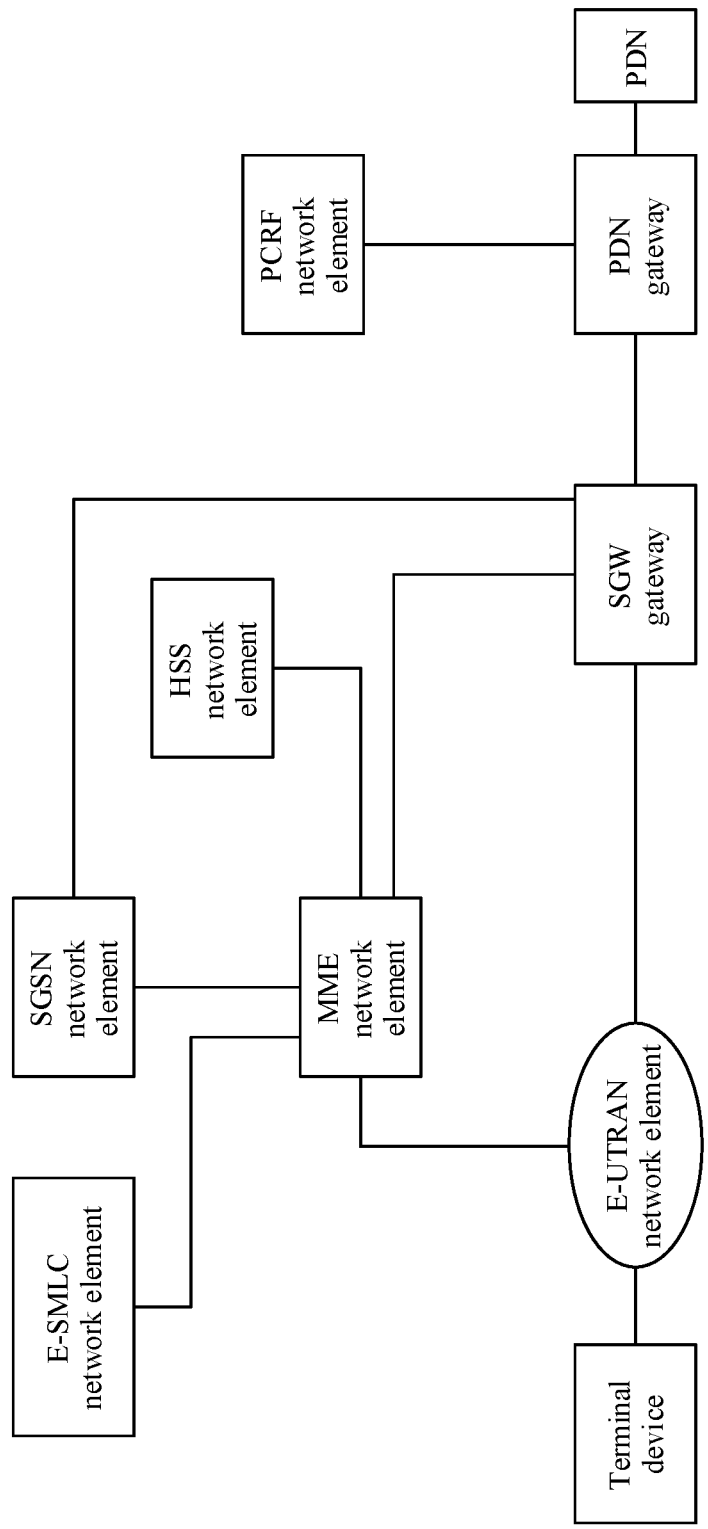
FIG. 1A is a schematic diagram of a 4th generation (4G) system architecture in the conventional technology.

FIG. 1A is a schematic diagram of a 4G system architecture in the conventional technology. As shown in FIG. 1A, the architecture includes: a terminal device, an evolved universal terrestrial radio access network (E-UTRAN) network element, a mobility management entity (MME) network element, a serving GPRS support node (SGSN) network element, a home subscriber server (HSS) network element, a serving gateway (SGW), a packet data network gateway, a policy and charging rules function (PCRF) network element, an evolved serving mobile location center (E-SMLC) network element, a packet data network (PDN), and the like. The network elements communicate with each other through interfaces defined in the 3GPP.

Figure 1B:
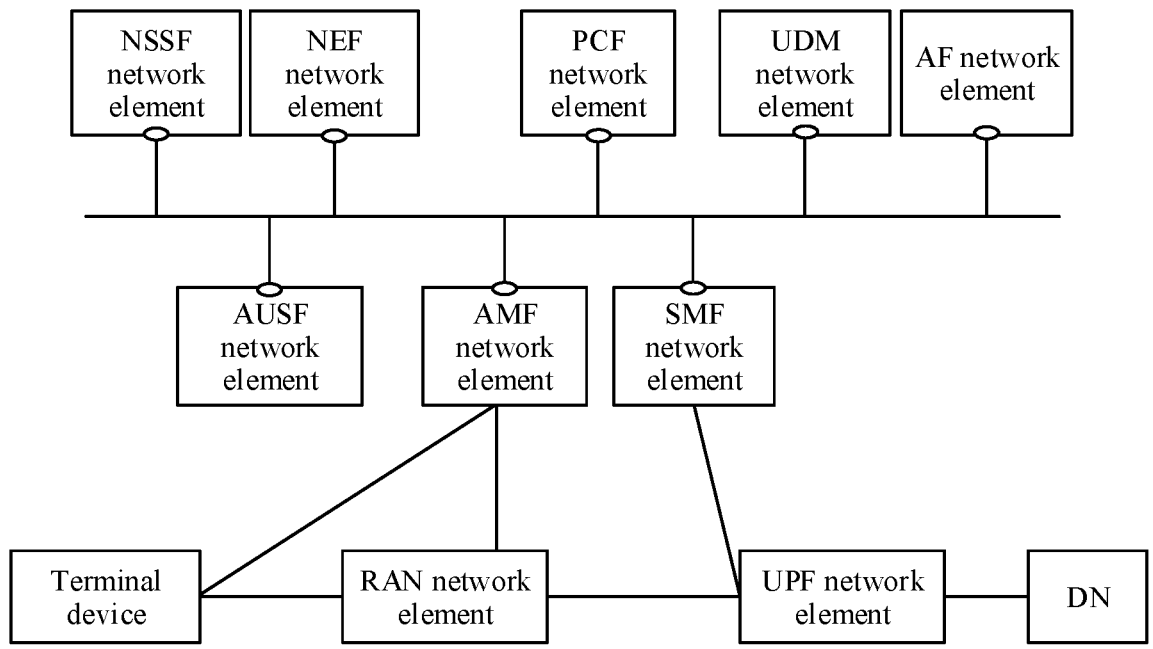
FIG. 1B is a schematic diagram of a 5th generation (5G) system architecture in the conventional technology.

FIG. 1B is a schematic diagram of a 5G system architecture in the conventional technology. As shown in FIG. 1B, the architecture includes: a terminal device, a radio access network (RAN) network element, a user plane function (UPF) network element, a DN, an access and mobility management function (AMF) network element, a session management function (SMF) network element, a policy control function (PCF) network element, an application function (AF), a network slice selection function (NSSF) network element, an authentication server function (AUSF) network element, and a unified data management (UDM) network element.

In the communications architectures shown in FIG. 1A and FIG. 1B, the following network elements are further introduced into the embodiments of this application.

A network data analysis network element is introduced. The network data analysis network element is a network element that has a data analysis function. For example, referring to FIG. 1A, in the 4G network architecture, the network data analysis network element is an independent network element connected to the MME, or the network data analysis network element is integrated into the E-UTRAN network element. For another example, in the 5G network architecture, the network data analysis network element can analyze data provided by the radio access network (RAN) network element, data provided by a third-party network element such as the UMM network element, data provided by a location management function (LMF) network element, and other data. During specific implementation, the network data analysis network element may be integrated into an access network element, that is, the RAN network element, or the network data analysis network element may be independently disposed.

An assisted unmanned management function (AUMF) network element is introduced. The AUMF network element may be an independent network element, or may be integrated into another network element. For example, referring to FIG. 1A, in the 4G network architecture, the AUMF network element is an independent network element connected to the MME, or the AUMF network element is disposed on the MME. For another example, referring to FIG. 1B, in the 5G network architecture, the AUMF network element is an independent network element, or the AUMF network element may be integrated into a network exposure function (NEF) network element, the policy control function (PCF) network element, a network data analysis network element (NWDAF), and a UMM network element.

An authorized law enforcement offices (ALEO) server is introduced. The authorized law enforcement offices server sends management and control information to a core network element AUMF through a UMM network element.

A UMM network element is introduced. A supervision system is deployed on the unmanned monitoring and management network element, and a unique identity of an authorized terminal device or a cooperative terminal device is registered in the supervision system. The UMM network element may be deployed on a third-party network element. If the supervision is entrusted to an operator, the UMM network element may be deployed on a core network side as a core network element. For example, an unmanned monitoring and management function (UMMF) network element is added to the 5G network architecture.

It should be noted that only basic network elements are listed in the network architectures shown in FIG. 1A and FIG. 1B. A network architecture to which the method for identifying a terminal device in the embodiments is applicable may be the network architecture shown in FIG. 1A or FIG. 1B, or may be a network element derived from the network architecture shown in FIG. 1A or FIG. 1B, for example, a new network element added to the network architecture shown in FIG. 1A or FIG. 1B. For another example, another function is integrated into the network elements shown in FIG. 1A and FIG. 1B, so that the integrated network elements may have new functions in addition to original functions.

The terminal device in the embodiments of this application includes a ground terminal device and an air terminal device. The air terminal device is mainly an unmanned aerial vehicle terminal device. The ground terminal device includes a mobile phone, a tablet computer, a notebook computer, a palmtop computer, a mobile internet device (MID), a wearable device such as a smart watch, a smart band, or a pedometer, and an unmanned aerial vehicle terminal device that flies on the ground. Specifically, the unmanned aerial vehicle terminal device may alternatively include an authorized unmanned aerial vehicle terminal device and an unauthorized unmanned aerial vehicle terminal device. The authorized unmanned aerial vehicle terminal device is an unmanned aerial vehicle terminal device that strictly complies with a supervision criterion, and the unauthorized unmanned aerial vehicle terminal device is an unmanned aerial vehicle terminal device that violates a supervision criterion. The supervision criterion includes registration and authorization in the supervision system, periodic reporting of locations during flight, and prohibition of entry into no-fly zones. The unauthorized unmanned aerial vehicle terminal device may also be referred to as a rogue unmanned aerial vehicle (UAV).

Air interface features of the ground terminal device and the air terminal device differ greatly. Generally, compared with the ground terminal device, the air terminal device has a higher height relative to the ground, a longer distance from a serving cell, a higher cell handover frequency, and a larger cell handover delay difference. For example, in an advanced wireless service (AWS) frequency band, a quantity of cells detected by the ground terminal device is less than a quantity of cells detected by the air terminal device. For another example, in a personal communication service (PCS) frequency band, a serving cell distance of the ground terminal device is less than a serving cell distance of the air terminal device, and the serving cell distance is a distance between the ground terminal device or the air terminal device and a center of the serving cell. In addition, in addition to the quantity of detected cells, a distance between a detected cell and the serving cell, the handover delay, and the handover frequency, the air terminal device and the ground terminal device also have differences in other parameters, for example, differences in a handover success rate, reference signal received quality (RSRQ), reference signal received quality (RSRQ), a signal to interference plus noise ratio (SINR), and an uplink transmit power.

A first terminal device in the embodiments of this application is a terminal device that needs to be identified.

The third-party network element in the embodiments of this application is a network element disposed in the DN in the 4G network architecture and the 5G network architecture, for example, the UMM network element, or the authorized law enforcement offices (ALEO) server. The UMM network element may alternatively be deployed on the core network side.

A network side network element in the embodiments of this application includes the E-UTRAN network element or the evolved serving mobile location center (E-SMLC) network element in the 4G network architecture, or includes the RAN network element, the access and mobility management function (AMF) network element, or the like in the 5G network architecture.

For a unified data management (UDM) network element in the embodiments of this application, in the 5G network architecture, the UDM network element is a network element disposed on a network side.

An access network element in the embodiments of this application refers to the E-UTRAN network element in the 4G network architecture, and refers to the RAN network element in the 5G network architecture.

In the embodiments of this application, an example in which the terminal device is an unmanned aerial vehicle is used for description.

Figure 2A:
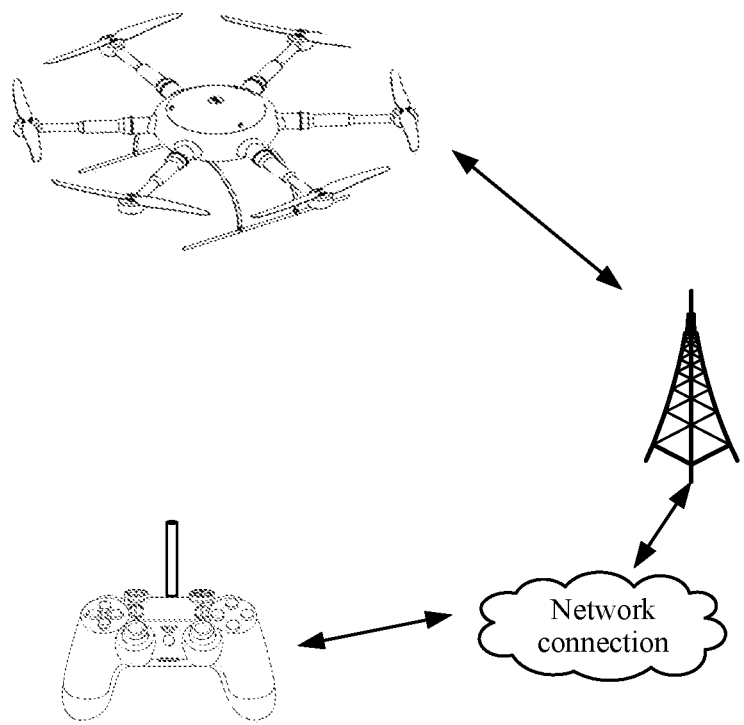
FIG. 2A is a schematic diagram of a scenario to which a method for identifying a terminal device is applicable according to an embodiment of this application.
Figure 2B:
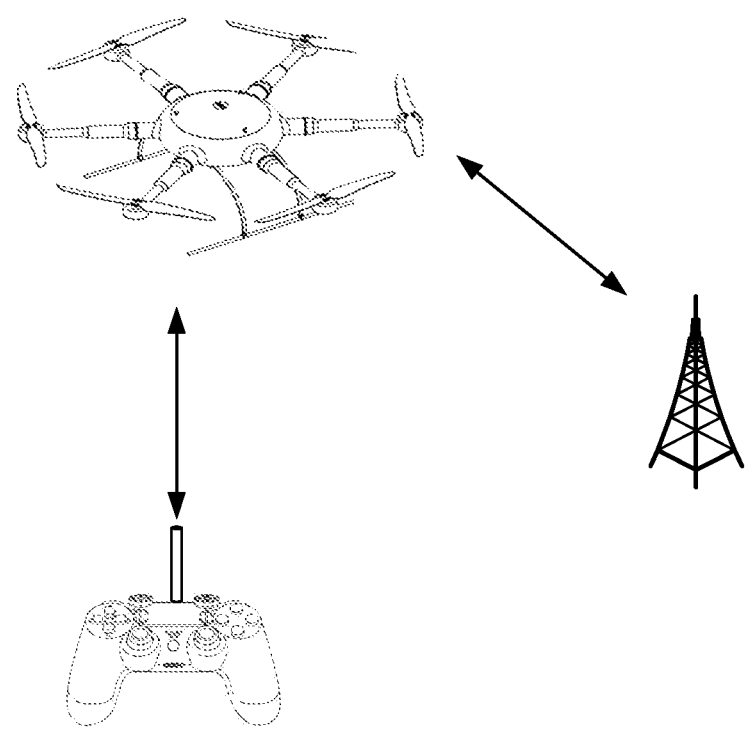
FIG. 2B is a schematic diagram of a scenario to which a method for identifying a terminal device is applicable according to another embodiment of this application.
Figure 2C:
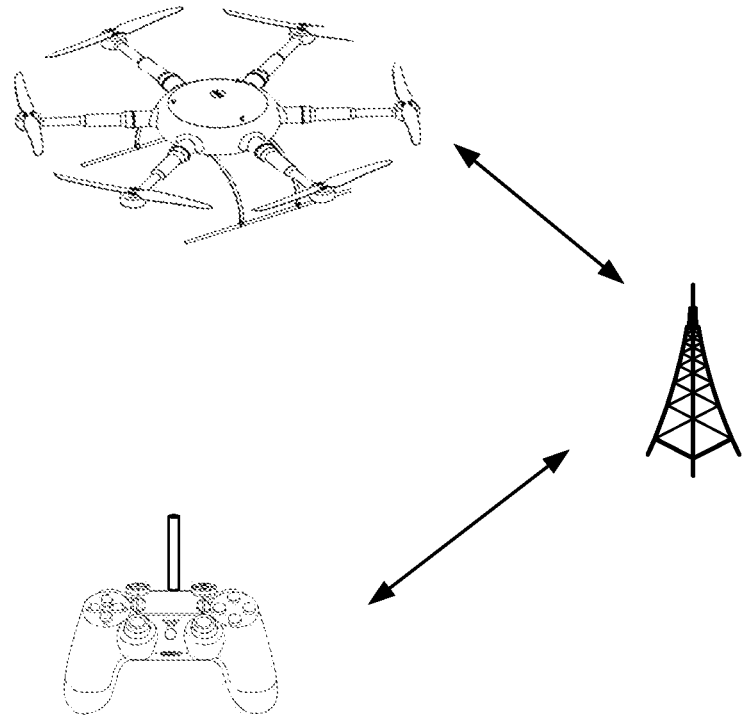
FIG. 2C is a schematic diagram of a scenario to which a method for identifying a terminal device is applicable according to still another embodiment of this application.

In the embodiments of this application, the terminal device accesses a cellular network via the access network element, and a controller controls the terminal device through the cellular network or another network. FIG. 2A, FIG. 2B, and FIG. 2C are schematic diagrams of applicable scenarios according to the embodiments of this application.

FIG. 2A is a schematic diagram of a scenario to which a method for identifying a terminal device is applicable according to an embodiment of this application. Referring to FIG. 2A, in this scenario, a controller of a terminal device is connected to an application server through a network (through a network other than a cellular network, for example, through a wired network), and indirectly controls a terminal device (that is, an unmanned aerial vehicle) via the application server, and the terminal device accesses a cellular network. The cellular network is, for example, the 4G or 5G network architecture provided in FIG. 1A and FIG. 1B.

FIG. 2B is a schematic diagram of a scenario to which a method for identifying a terminal device is applicable according to another embodiment of this application. Referring to FIG. 2B, in this scenario, a controller of a terminal device controls a terminal device by using a dedicated radio frequency protocol used by a manufacturer. The terminal device needs to access a cellular network (for example, a 4G network or a 5G network), and the controller of the terminal device does not need to access the cellular network.

FIG. 2C is a schematic diagram of a scenario to which a method for identifying a terminal device is applicable according to still another embodiment of this application. Referring to FIG. 2C, in this scenario, both a controller of a terminal device and a terminal device access a cellular (for example, a 4G or 5G) network, and the controller of the terminal device controls the terminal device through the network.

In the foregoing scenarios, the 4G network is a network provided by the network architecture shown in FIG. 1A, and the 5G network is a network provided by the network architecture shown in FIG. 1B. The terminal device accesses the 4G network via an E-UTRAN network element, or accesses the 5G network via a RAN network element. The embodiments of this application are applicable to a scenario of identification of a terminal device that accesses the 4G network or the 5G network, and in particular, to a remote control scenario shown in FIG. 2A and FIG. 2C. When an unmanned aerial vehicle is an unauthorized unmanned aerial vehicle or an unauthorized aircraft, there is a relatively high degree of threat to security.

The 5G network architecture shown in FIG. 1B is used as an example to describe in detail the method for identifying a terminal device in this application. For details, refer to FIG. 3 and FIG. 4.

Figure 3:
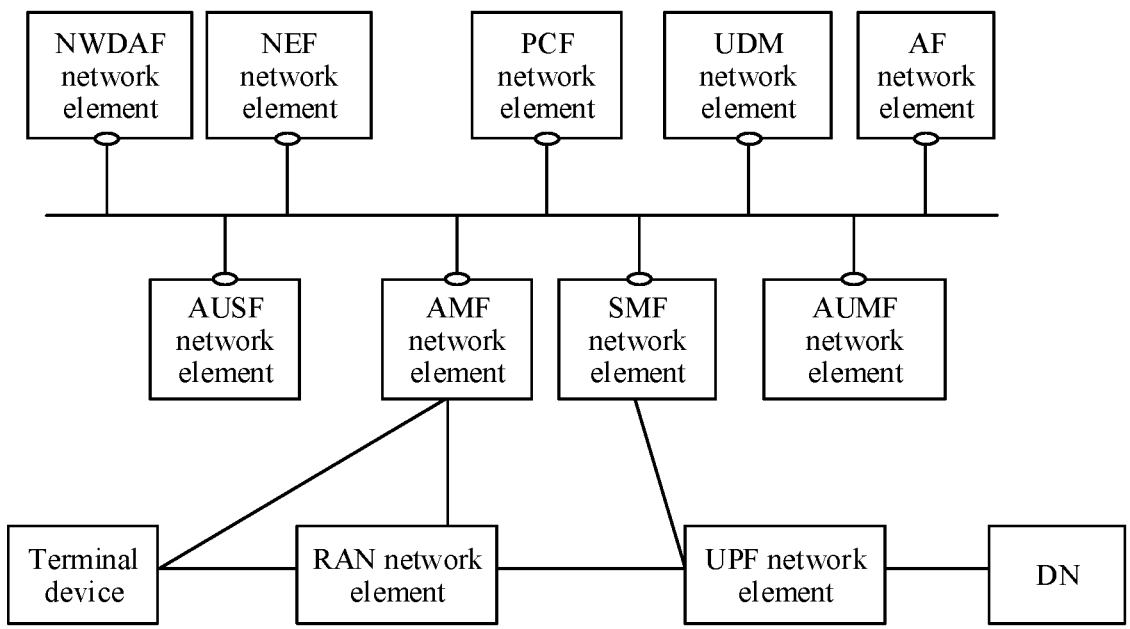
FIG. 3 is a schematic diagram of a 5G network architecture according to an embodiment of this application.
Figure 4:
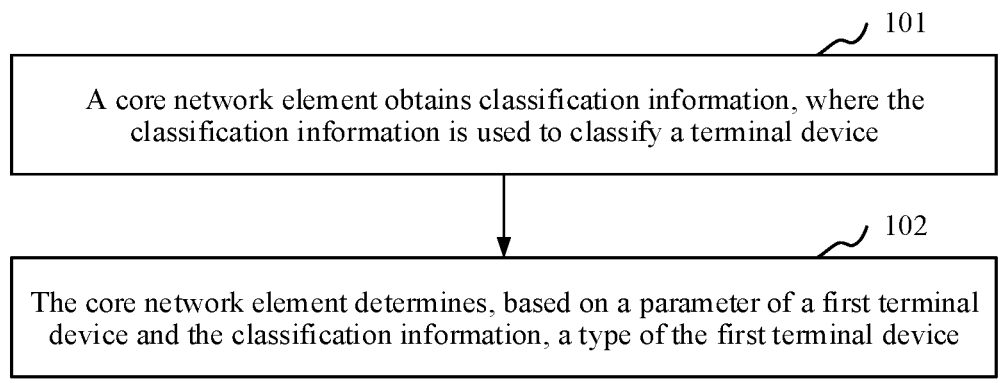
FIG. 4 is a flowchart of a method for identifying a terminal device applicable to the network architecture shown in FIG. 3 according to an embodiment of this application.
Figures 1, 5A:
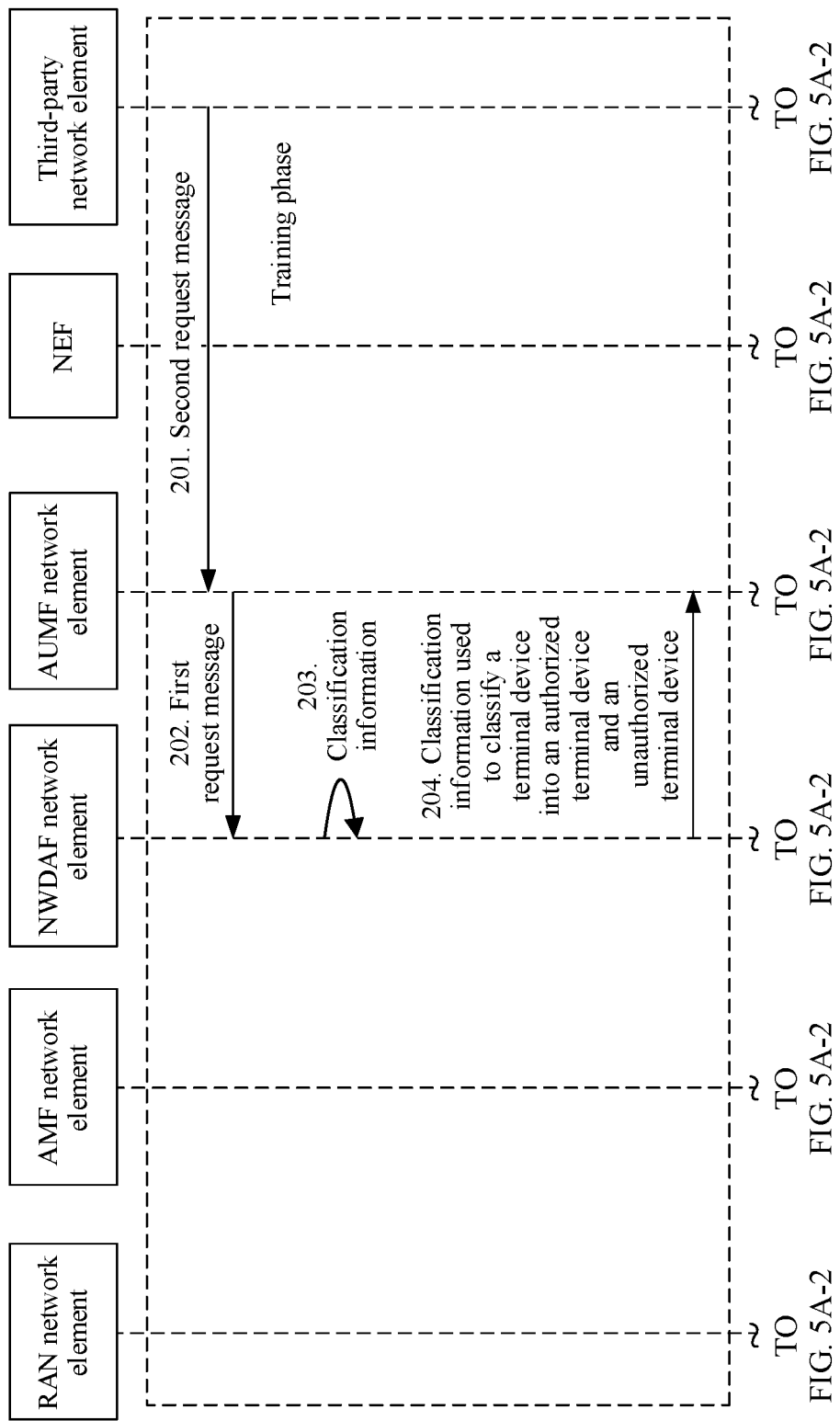
Figures 2, 5A:
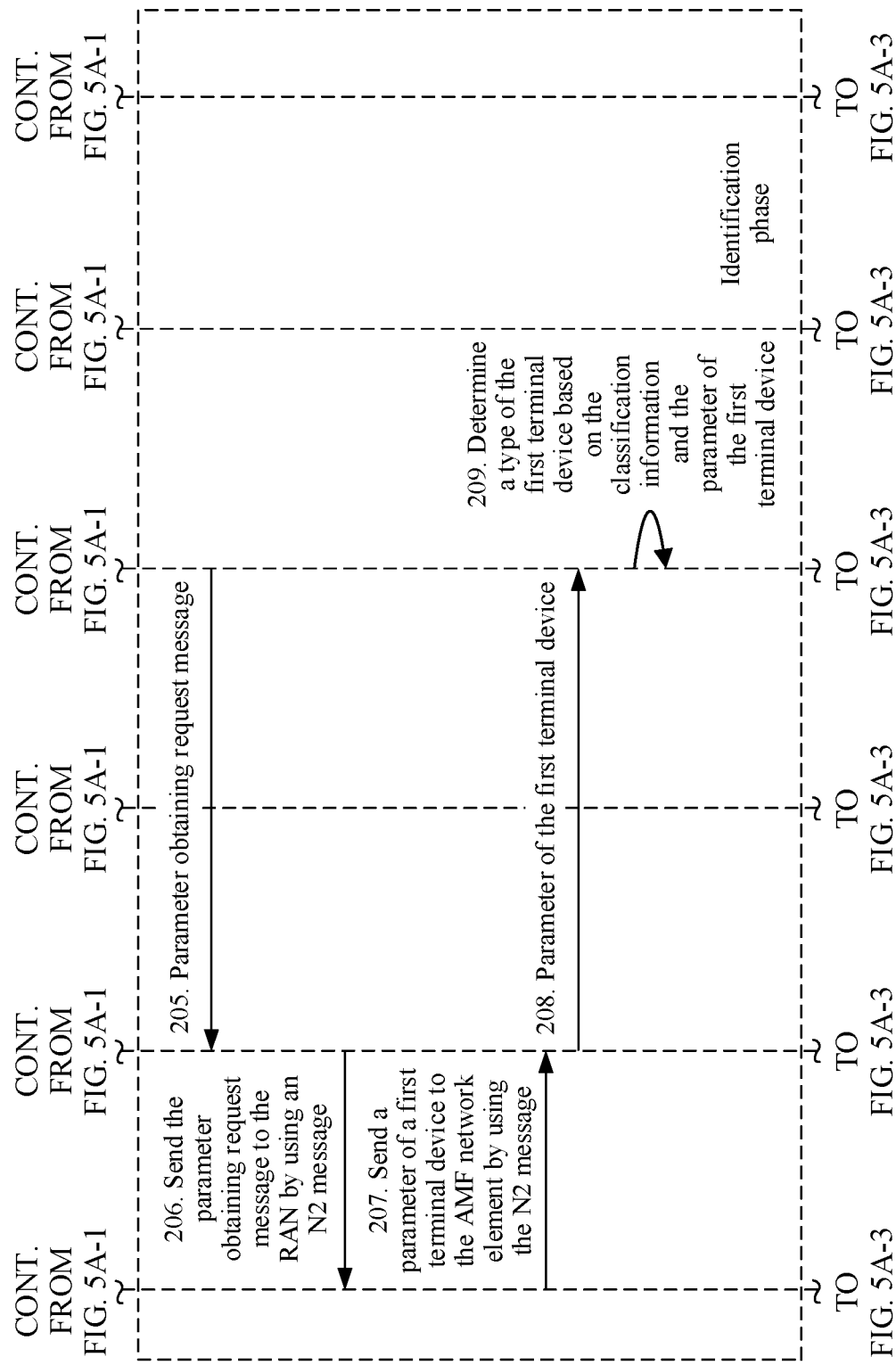
Figures 1, 5B:
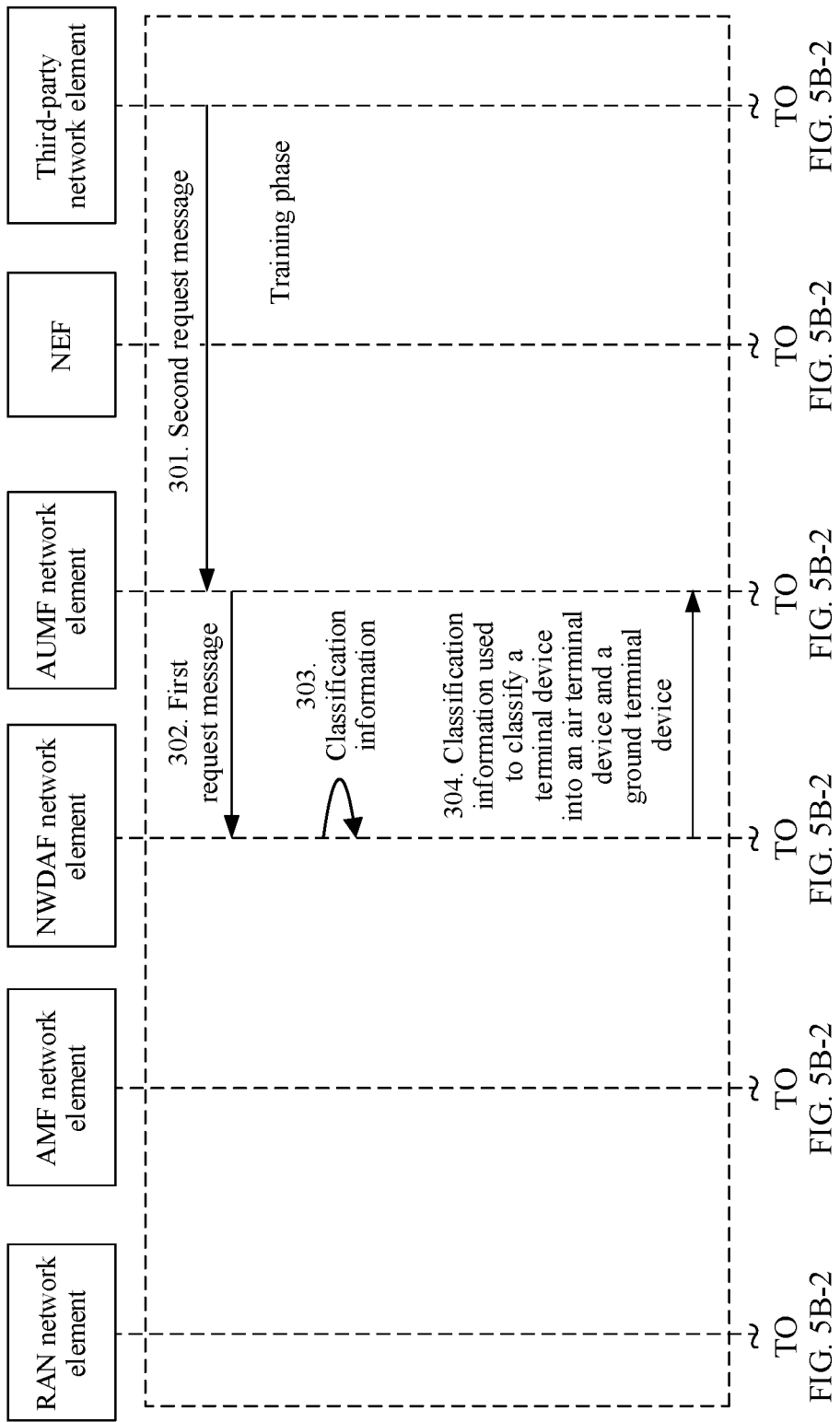
Figures 2, 5B:
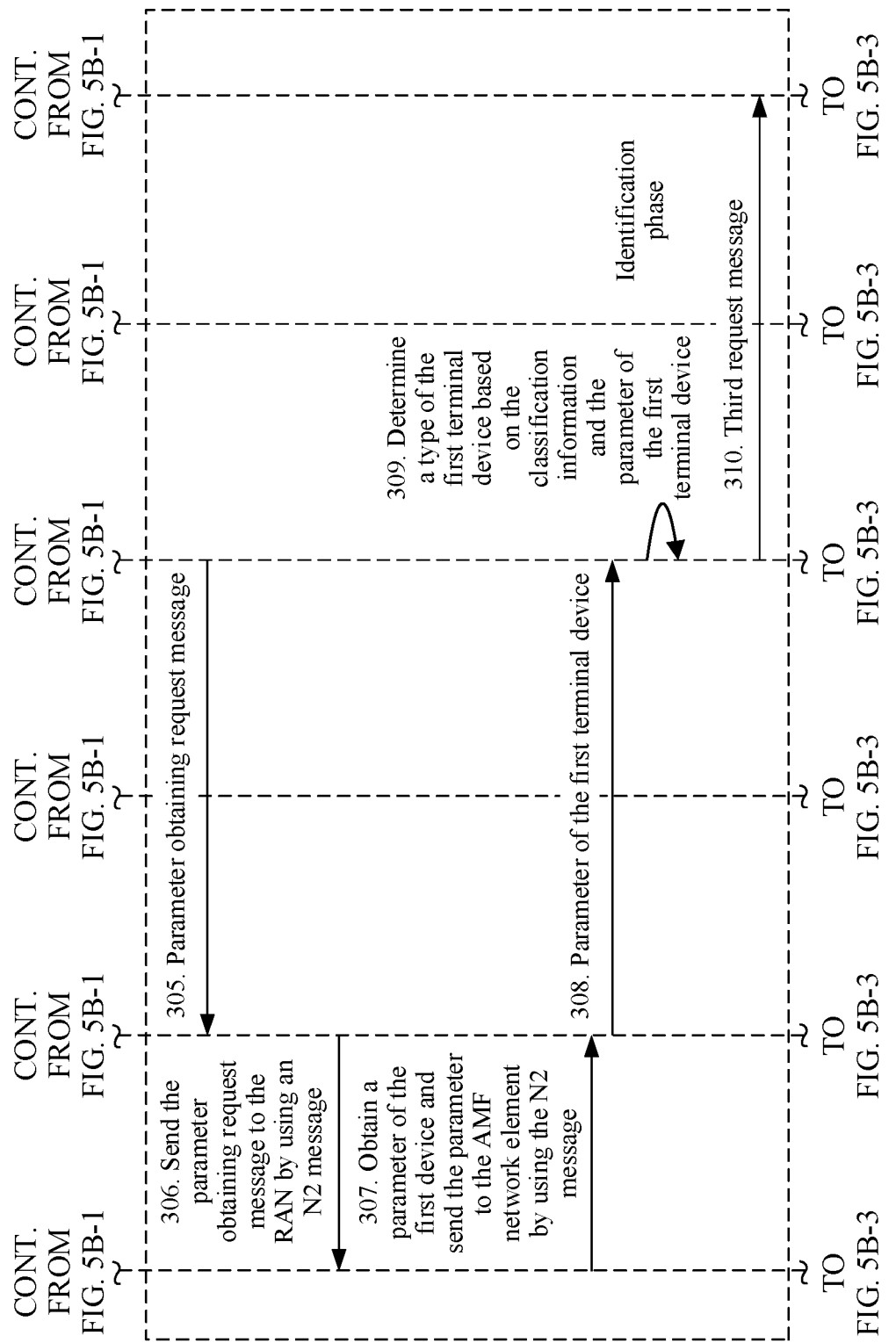
Figures 3, 5B:
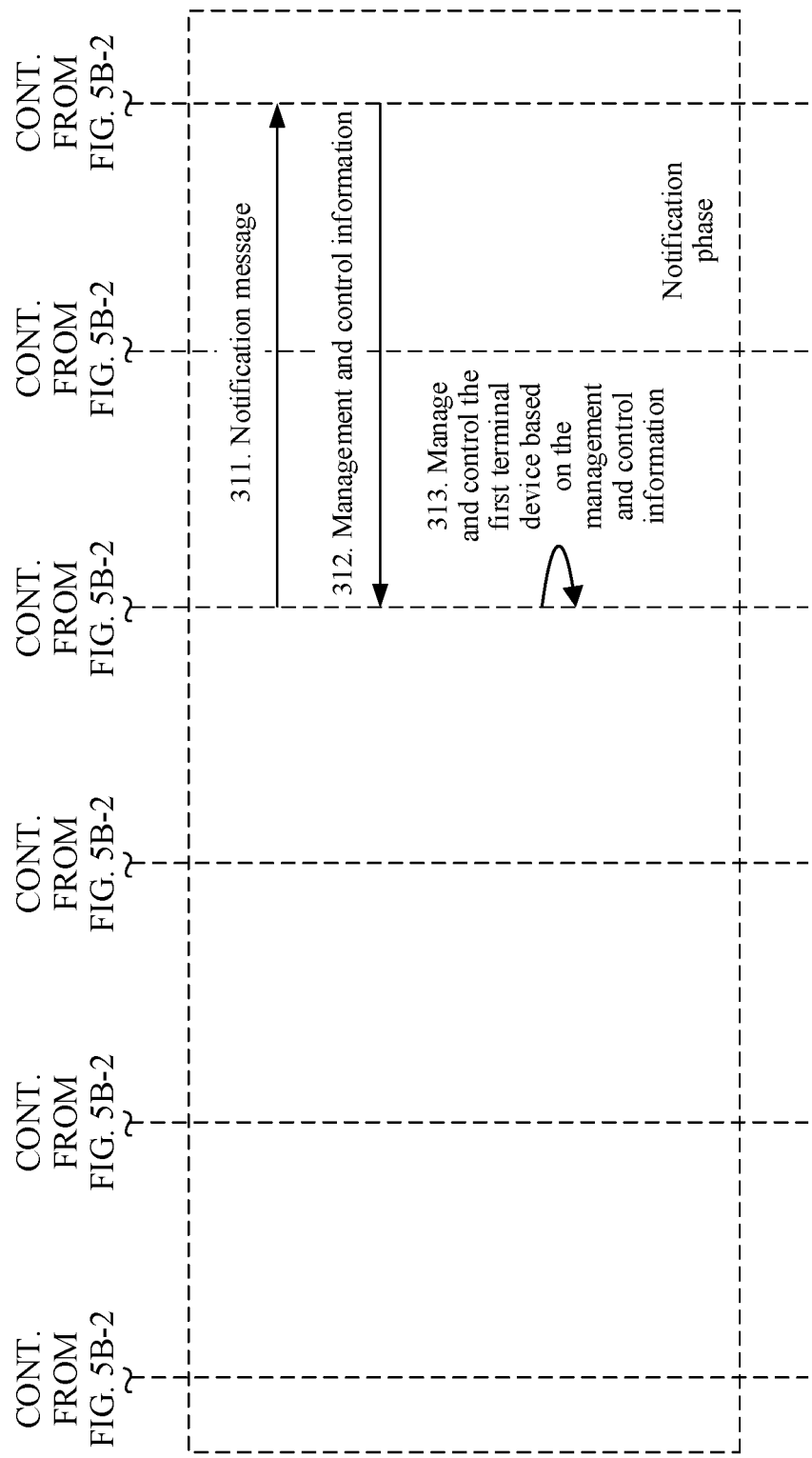

FIG. 3 is a schematic diagram of a 5G network architecture according to an embodiment of this application. FIG. 4 is a flowchart of a method for identifying a terminal device applicable to the network architecture shown in FIG. 3 according to an embodiment of this application. Referring to FIG. 3, compared with FIG. 1B, a core network element, that is, an AUMF network element, is added to the 5G network architecture shown in this embodiment. Referring to FIG. 4, in this embodiment, a core network element is specifically an AUMF network element. The method for identifying a terminal device in this application is described in this embodiment from a perspective of the core network element. This embodiment includes the following steps.

101. The core network element obtains classification information, where the classification information is for classifying a terminal device.

In this step, the core network element obtains the classification information used to classify the terminal device. For example, the core network element obtains the classification information from a network data analysis network element. The classification information is for classifying the terminal device into an authorized terminal device or an unauthorized terminal device. Alternatively, the classification information is for classifying the terminal device into an air stationary terminal device, an air flight terminal device, a ground stationary terminal device, or a ground mobile terminal device.

102. The core network element determines, based on a parameter of a first terminal device and the classification information, a type of the first terminal device.

In this embodiment of this application, the parameter of the first terminal device may be, for example, at least one of a quantity of detected cells, a distance between a detected cell and a serving cell, a handover delay, a handover frequency, a handover success rate, a reference signal received power (RSRP), reference signal received quality (RSRQ), a signal to interference plus noise ratio (SINR), or an uplink transmit power.

In this step, the core network element determines, based on the parameter of the first terminal device and the classification information, the type of the first terminal device. The first terminal device refers to all or a portion of terminal devices in a supervision area, and the supervision area may be a preconfigured area or an area specified by a third-party network element.

According to the method for identifying a terminal device provided in this embodiment of this application, the core network element obtains the classification information used to classify the terminal device, and then determines, based on the classification information and the parameter of the first terminal device, the type of the first terminal device, to identify the first terminal device. In this process, the core network element identifies the first terminal device in the supervision area by using the classification information and the parameter of the first terminal device, to identify a terminal device that is not registered in a supervision system, thereby improving security of the terminal device.

In a feasible implementation, before obtaining the classification information, the core network element further sends a first request message to the network data analysis network element, where the first request message requests the classification information. After receiving the first request message, the network data analysis network element sends the classification information to the core network element. Correspondingly, the core network element receives the classification information.

Specifically, referring to FIG. 3, in this implementation, in addition to the AUMF network element, the network data analysis network element, that is, an NWDAF network element, is newly added. The AUMF network element and the NWDAF network element are both independent network elements. In a process for identifying the terminal device, the core network element first sends the first request message to the network data analysis network element. Correspondingly, the network data analysis network element receives the first request message. The first request message requests the classification information, and the classification information is for classifying the terminal device. Then, the network data analysis network element sends the classification information to the core network element. Correspondingly, the core network element receives the classification information. Finally, the core network element determines, based on the parameter of the first terminal device and the classification information of the terminal device, the type of the first terminal device.

It should be noted that, in FIG. 3, the network data analysis network element (NWDAF network element) is an independent network element, and is independently disposed with a RAN network element. However, this embodiment of this application is not limited thereto. In another feasible implementation, the network data analysis network element and the RAN network element are integrally disposed. During the integrated disposition, the network data analysis network element is integrated into the RAN network element or another core network element. To be specific, the RAN network element or the another core network element has a data analysis capability.

In a possible implementation, when the classification information is for classifying the terminal device into an authorized terminal device and an unauthorized terminal device, the core network element may determine, based on the classification information and the parameter of the first terminal device, whether the first terminal device is the authorized terminal device or the unauthorized terminal device. In another possible implementation, when the classification information is for classifying the terminal device into an air stationary terminal device, an air flight terminal device, a ground stationary terminal device, or a ground mobile terminal device, the core network element may determine, based on the classification information and the parameter of the first terminal device, a type of the first terminal device. When determining that the first terminal device is the air terminal device (that is, the air stationary terminal device or the air flight terminal device), the core network element may further determine whether the air terminal device is an unauthorized terminal device.

According to the method for identifying a terminal device provided in this embodiment of this application, the core network element identifies the first terminal device by using the classification information provided by the network data analysis network element. In this way, a terminal device that is not registered in a supervision system can be identified, thereby improving security of using the terminal device.

In a feasible implementation, before sending the first request message to the network data analysis network element, the core network element further receives a second request message sent by a third-party network element, where the second request message requests the type of the first terminal device. After determining the type of the first terminal device based on the parameter of the first terminal device and the classification information, the core network element further sends a response message to the third-party network element, where the response message includes type information of the first terminal device.

The third-party network element may be, for example, a UMM network element or an ALEO server that is set in a DN. The UMM network element or the ALEO server sends the second request message to the core network element via a capability open platform, to subscribe to an identification event. During specific implementation, the UMM network element or the ALEO server subscribes to the identification event from the core network element (that is, the AUMF network element) via an NEF network element, or when the third-party network element is in a trusted domain, the third-party network element may directly subscribe to the event from the core network element. After determining the type of the first terminal device, the core network element sends the response message including the type information of the first terminal device to the third-party network element. The type information is used to indicate the type of the first terminal device, or the type information is specifically indication information. A form of the indication information includes but is not limited to: combination information of an identifier of the first terminal device and information indicating whether the first terminal device is an unauthorized terminal device, combination information of an identifier of the first terminal device and information indicating whether the first terminal device is an air terminal device, and combination information of an identifier of the first terminal device and a list of unauthorized terminal devices.

The second request message may include one or more of identification information of the first terminal device, supervision area information, and an identification precision requirement. The following separately describes each piece of information included in the second request message.

Identification Information of the First Terminal Device

The identification information of the first terminal device is, for example, an international mobile subscriber identity (ISMI) of the first terminal device.

Supervision Area Information

The supervision area information indicates geographical location information of the supervision area, unmanned aerial vehicle fence information, or the like. The geographical location information is, for example, information about a province, a city, or a residential community. The unmanned aerial vehicle fence information is information defined by a third party, and is used to indicate a no-fly zone (or a flight-restricted zone).

Identification Precision Requirement

Different identification precision requirements indicate different quantities of times that the core network element obtains the parameter of the first terminal device. For example, when the classification information is for classifying the terminal device into an air stationary terminal device, an air flight terminal device, a ground stationary terminal device, or a ground mobile terminal device, when identifying whether the first terminal device is the air stationary terminal device, the core network element obtains the parameter (the parameter of the first terminal device) for a relatively small quantity of times, or when identifying whether the first terminal device is the air flight terminal device, the core network element obtains the parameter for a relatively large quantity of times.

It should be noted that the foregoing describes this embodiment of this application in detail by using an example in which the identification information of the first terminal device and the supervision area information are explicitly indicated in the second request message. However, this is not limited in this embodiment of this application. In another feasible implementation, the identification information of the first terminal device and the like may alternatively be implicitly indicated. For example, the second request message carries the supervision area information, but does not carry the identification information of the first terminal device. In this case, all or a portion of terminal devices in the supervision area indicated by the supervision area information may be used as the first terminal device. In other words, all or a portion of terminal devices in the supervision area are identified. For another example, when a no-fly zone (or a flight-restricted zone) is not specified, the third-party network element explicitly or implicitly indicates the core network element to identify the terminal device in a suspicious terminal device list, where the suspicious terminal device list lists an identifier of a suspicious terminal device, for example, an external identifier, a 3GPP identifier and the like, and the identifier is sent to the core network element by using the second request message. The supervision area is, for example, the no-fly zone (or the flight-restricted zone).

In this embodiment, the third-party network element sends the second request message to the core network element, to trigger the core network element to identify the first terminal device. In this process, the core network element may be flexibly triggered, based on a requirement of the third-party network element, to identify the first terminal device. The third-party network element may carry related information of the first terminal device in the second request message and send the second request message to the core network element, to further flexibly trigger, based on the requirement of the third-party network element, the core network element to identify the first terminal device.

In a feasible implementation, the first request message includes one or more of the following information: the identification precision requirement, a training data source, a training data type, and a training model type.

Specifically, when requesting the classification information, the core network element may carry the one or more of the identification precision requirement, the training data source, the training data type, and the training model type in the first request message, and send the first request message to the network data analysis network element, so that the network data analysis network element obtains the classification information based on the information.

For example, the first request message carries the training data source, and is used to indicate the network data analysis network element to obtain training data from a corresponding data source. Specifically, if the training data source is a RAN network element and a UMM network element, the network data analysis network element collects the training data via the RAN network element and the UMM network element, and obtains the classification information based on the training data. If the training data source is a RAN and an operation, administration and maintenance (OAM) system, the network data analysis network element collects the training data via the RAN and the OAM system, and obtains the classification information based on the training data. The training data directly obtained from the RAN network element is usually real-time data, and is real-time data of a plurality of terminal devices. The training data obtained from the OAM network element is usually historical data or sampling data, and is historical data or sampling data of a plurality of terminal devices. For a specific terminal device, real-time data, historical data, or sampling data includes at least one of a quantity of cells detected by the terminal device, a distance between a detected cell and a serving cell, a handover delay, a handover frequency, a handover success rate, a reference signal received power RSRP, reference signal received quality RSRQ, a signal to interference plus noise ratio SINR, or an uplink transmit power.

For another example, the first request message carries the training data type, and is used to indicate the network data analysis network element to obtain a corresponding data type. Specifically, the training data type may include at least one of a quantity of detected cells, a distance between a detected cell and a serving cell, a handover delay, a handover frequency, a handover success rate, a reference signal received power (RSRP), reference signal received quality (RSRQ), a signal to interference plus noise ratio (SINR), or an uplink transmit power. For example, if the training data type carried in the first request message includes the quantity of detected cells and the handover frequency, the network data analysis network element obtains only the two types of data from the training data source, or selects only the quantity of detected cells and the handover frequency from data provided by the training data source as the training data.

For another example, the first request message carries the training model type, and is used to indicate the network data analysis network element to collect or train corresponding classification information. A specific training model type may be an unauthorized terminal device model, an authorized terminal device model, an air stationary terminal device model, an air flight terminal device model, a ground stationary terminal device model, or a ground mobile terminal device model. For example, the training model type includes the air stationary terminal device model, the air flight terminal device model, the ground stationary terminal device model, or the ground mobile terminal device model. In this case, the network data analysis network element trains the training data to obtain the four models. When the network data analysis network element trains the four models, a quantity of times of obtaining the training data varies based on different models. For example, a quantity of times of obtaining the training data when the air flight terminal device model is trained is greater than a quantity of times of obtaining the training data when the air stationary terminal device model is trained. In this embodiment of this application, the model trained by the network data analysis network element may be classification information generated through machine learning or training according to a big data analysis algorithm, or may be classification information generated based on statistics or simple logic. For example, during training, the network data analysis network element selects, based on an identification precision requirement, a classification algorithm such as a naive Bayes algorithm, a decision tree algorithm, a neural network algorithm, and a support vector machine (SVM) algorithm, and trains the training data to obtain the classification information.

For another example, the first request message carries the identification precision requirement. If the identification precision requirement is relatively high, the network data analysis network element selects a classification algorithm with relatively high accuracy to train the training data, to obtain classification information with relatively high accuracy. The classification information may be used to accurately classify the terminal device, and a misjudgment is less likely to occur. If the identification precision requirement is relatively low, the network data analysis network element selects a classification algorithm with relatively low accuracy to train the training data, to obtain classification information with relatively low accuracy. When the classification information is for classifying the terminal device, a misjudgment is likely to occur, but an identification requirement of the third-party network element can be met. In this embodiment of this application, the identification precision requirement carried in the first request message may be, for example, obtained by the network data analysis network element based on the identification precision requirement in the second request message. During specific implementation, the identification precision requirement in the first request message and the identification precision requirement in the second request message have a same representation form, that is, the two requirements are the same. Alternatively, after receiving the second request message that carries the identification precision requirement and that is sent by the third-party network element, the core network element converts the identification precision requirement into a form that can be identified by the network data analysis network element, carries the converted identification precision requirement in the first request message, and sends the first request message to the network data analysis network element.

In this embodiment, the core network element sends information related to the classification information, for example, the identification precision requirement, the training data source, the training data type, and the training model type, to the network data analysis network element by using the first request message, so that the network data analysis network element obtains classification data based on a requirement, to meet a requirement of flexibly obtaining the classification information in a process for identifying the terminal device.

In a feasible implementation, before determining the type of the first terminal device based on the parameter of the first terminal device and the classification information of the terminal device, the core network element further obtains the parameter of the first terminal device.

For example, a network side network element sends the parameter of the first terminal device to the core network element. Correspondingly, the core network element receives the parameter of the first terminal device. The network side network element is, for example, a RAN or an OAM system. A parameter provided by the RAN is a real-time parameter of the first terminal device, and a parameter provided by the OAM system is a historical parameter or a sampling parameter of the first terminal device. The parameter includes at least one of a quantity of detected cells, a distance between a detected cell and a serving cell, a handover delay, a handover frequency, a handover success rate, a reference signal received power (RSRP), reference signal received quality (RSRQ), a signal to interference plus noise ratio (SINR), or an uplink transmit power.

For another example, the third-party network element sends the parameter of the first terminal device to the core network element. Correspondingly, the core network element receives the parameter of the first terminal device. The third-party network element is, for example, a UMM network element. A supervision system is set on the UMM network element, and all authorized terminal devices (mainly referred to as authorized unmanned aerial vehicles) are registered in the supervision system. Therefore, the UMM network element stores a transmission feature and/or service feature data of an authorized terminal device. The data includes a heartbeat period, a flight mode/motion feature, and the like. For the heartbeat period, the authorized terminal device needs to periodically report information such as a status and a location of the authorized terminal device. Therefore, the authorized terminal device has the heartbeat period. However, because an unauthorized terminal device is not registered in the supervision system, the unauthorized terminal device does not have a feature of periodically reporting information, that is, the unauthorized terminal device does not have a heartbeat period. For the transmission feature and/or the service feature data, the authorized terminal device has an authorized flight zone, a flight track, a flight speed, a flight height, or the like, and an unauthorized terminal device does not have the feature.

In addition, the parameter of the first terminal device further includes information provided by another core network element, for example, location information provided by a location management function (LMF) network element.

In a feasible implementation, if the core network element determines that the first terminal device is an air terminal device, that is, identifies that the first terminal device is an air flight terminal device or an air stationary terminal device, the core network element further sends a third request message to a unified data management (UDM) network element or the third-party network element, where the third request message is used to verify whether the first terminal device is the unauthorized terminal device.

Specifically, when the network data analysis network element trains the data to obtain the classification information, if the training data source is only a RAN network element or another core network element, but there is no data provided by the third-party network element, the classification information obtained by training the training data by the network data analysis network element can classify the first terminal device only into the air stationary terminal device, the air flight terminal device, a ground stationary terminal device, or a ground mobile terminal device. After receiving the classification information, if the core network element determines, based on the classification information and the parameter of the first terminal device, that the first terminal device is the air terminal device (that is, the air stationary terminal device or the air flight terminal device), the core network element needs to send the third request message to the third-party network element or the UDM network element, to verify whether the first terminal device is the unauthorized terminal device.

For example, during verification, if the UDM network element stores subscription information of a cooperative/authorized unmanned aerial vehicle, the subscription information includes related information such as a type of the unmanned aerial vehicle. Alternatively, when accessing a cellular network, an authorized/cooperative unmanned aerial vehicle notifies the UDM network element of related information such as a type of the authorized/cooperative unmanned aerial vehicle by using a non-access stratum (NAS) message. In this case, the UDM network element stores the related information such as the type of the authorized/cooperative unmanned aerial vehicle. Therefore, after detecting that the first terminal device is the air terminal device, the core network element may send the third request message to the UDM network element, so that the UDM network element determines, based on the stored related information, whether the first terminal device is the unauthorized terminal device.

For another example, during verification, if an authorized/cooperative unmanned aerial vehicle is reported to the supervision system deployed in the third-party network element during take-off, or an authorized/cooperative unmanned aerial vehicle is periodically reported to the supervision system deployed in the third-party network element during flight, the third-party network element also stores related information of the authorized/cooperative unmanned aerial vehicle. Therefore, after detecting that the first terminal device is the air terminal device, the core network element may send the third request message to the third-party network element, so that the third-party network element determines, based on the stored related information, whether the first terminal device is the unauthorized terminal device.

In this embodiment, when determining that the first terminal device is the air terminal device, the core network element further sends the third request message to the third-party network element or the UDM network element, to verify whether the first terminal device is the unauthorized terminal device, thereby identifying the first terminal device.

In a feasible implementation, when the first terminal device is an unauthorized terminal device, the core network element further sends a notification message to the third-party network element, where the notification message is used to indicate, to the third-party network element, that the first terminal device is the unauthorized terminal device.

Specifically, when identifying that the first terminal device is the unauthorized terminal device, the core network element sends the notification message to the third-party network device, to notify the third-party device that the first terminal device is the unauthorized terminal device. In addition, the unauthorized terminal device needs to be controlled to prevent a threat caused by the unauthorized terminal device to social security. In this case, the third-party network element determines management and control information based on a degree of the threat caused by the unauthorized terminal device, and sends the management and control information to the core network element, so that the core network element manages and controls the unauthorized terminal device, for example, disconnects a network connection of the unauthorized terminal device.

In this embodiment, after identifying that the first terminal device is the unauthorized terminal device, the core network element further manages and controls the unauthorized terminal device based on the management and control information of the third-party network element. In this process, the unauthorized terminal device is controlled to reduce the threat caused by the unauthorized terminal device to the security.

In a possible implementation, the core network element may alternatively be a PCF network element, a UMM network element, an NEF network element, or an NWDAF network element. For example, when the core network element is a PCF network element, the PCF network element not only has a basic policy control function, but also integrates a function of the foregoing AUMF network element. For another example, when the foregoing core network element is a UMM network element, the UMM network element is a network element on a network side. In other words, the UMM network element originally disposed in the DN is disposed on the network side, and a function of the foregoing AUMF network element is integrated into the UMM network element.

In the foregoing embodiment, the network data analysis network element and the RAN network element are independently disposed, or the network data analysis network element and the RAN network element are integrally disposed. The following describes the foregoing method for identifying a terminal device in detail by using an example in which the network data analysis network element and the RAN network element are independently disposed. For details, refer to FIG. 4 and FIG. 5A-1, FIG. 5A-2, and FIG. 5A-3.

FIG. 5A-1, FIG. 5A-2, and FIG. 5A-3 are a flowchart of a method for identifying a terminal device applicable to the network architecture shown in FIG. 3 according to another embodiment of this application. Referring to FIG. 5A-1, FIG. 5A-2, and FIG. 5A-3, in this embodiment, the core network element is specifically an AUMF network element. Compared with the embodiment in FIG. 4, in this embodiment, the communication method in this application is described from a perspective of interaction between a core network element and a network data analysis network element. In this embodiment, an NWDAF network element trains training data to obtain classification information, and the AUMF network element identifies, based on a parameter of a first terminal device and the classification information, the first terminal device. The classification information is for classifying the terminal device into an authorized terminal device or an unauthorized terminal device. This embodiment includes the following steps.

Training Phase:

201. A third-party network element sends a second request message to the AUMF network element.

In this step, the third-party network element sends the second request message to the AUMF network element via an NEF network element, or when the third-party network element is in a trusted domain, the third-party network element may directly send the second request message to the AUMF network element, to subscribe to an identification event. For simplicity of the figure, 201 in the figure shows that the third-party network element directly sends the second request message to the AUMF network element when the third-party network element is in the trusted domain. In another implementation, when the third-party network element sends the second request message to the AUMF network element via the NEF network element, the third-party network element may first send the second request message to the NEF network element, the NEF network element converts the second request message, and then the NEF network element sends the converted second request message to the AUMF network element. After receiving the converted second request message, the AUMF network element sends an acknowledgment message to the NEF network element, and the NEF network element sends the acknowledgment message to the third-party network element. The acknowledgment message is used to indicate whether the AUMF network element correctly receives the second request message. For example, the conversion is that the NEF network element converts identification information of the first terminal device that is carried in the second request message, and converts the identification information from an external identifier to an internal identifier. The external identifier is an identifier that can be identified by the third-party network element, and the internal identifier is an identifier that can be identified by the AUMF network element. In addition, the conversion may alternatively be that the NEF network element converts supervision area information carried in the second request message into information that can be identified by the AUMF network element, and the like.

For specific content of the second request message, refer to the description of the optional embodiment in FIG. 4. Details are not described herein again.

202. The AUMF network element sends a first request message to the NWDAF network element.

Specifically, for details of the first request message, refer to the description of step 101 in FIG. 4.

203. The NWDAF network element trains the training data based on the first request message to obtain the classification information.

In this step, assuming that the first request message carries a training data source, and the training data source is a RAN network element and a UMM network element, the network data analysis network element collects the training data via the RAN network element and the UMM network element, and obtains the classification information based on the training data. When the training data source includes the third-party network element such as the UMM network element, because a supervision system is set on the UMM network element, and all authorized terminal devices (mainly referred to as authorized unmanned aerial vehicles) are registered in the supervision system, the UMM network element stores a transmission feature and/or service feature data of an authorized terminal device. However, because an unauthorized terminal device is not registered in the supervision system, the UMM network element does not store a transmission feature and/or service feature data of the unauthorized terminal device. It can be learned that when the training data source includes the UMM network element, the NWDAF network element trains the training data, and the obtained classification information can be used to classify the terminal device into an authorized terminal device and an unauthorized terminal device. The transmission feature includes a heartbeat period, and the service feature data includes a flight mode/motion feature, and the like. For the heartbeat period, the authorized terminal device needs to periodically report information such as a status and a location of the authorized terminal device. Therefore, the supervision system stores that the authorized terminal device has the heartbeat period. However, because the unauthorized terminal device is not registered in the supervision system, and the unauthorized terminal device does not have a feature of periodically reporting information, the supervision system does not store that the unauthorized terminal device does not have a heartbeat period. For the transmission feature and/or service feature data, the supervision system stores a flight zone, a flight track, a flight speed, a flight height, or the like authorized by the authorized terminal device, and the supervision system does not store a feature such as a flight zone or a flight track of the unauthorized terminal device.

204. The NWDAF network element sends, to the AUMF network element, the classification information used to classify the terminal devices into the authorized terminal device and the unauthorized terminal device.

Correspondingly, the AUMF network element receives the classification information.

Identification Phase:

205. The AUMF network element sends a parameter obtaining request message to an AMF network element, to obtain the parameter of the first terminal device.

In this step, the AUMF network element determines the proper AMF network element based on a supervision area, and then sends the parameter obtaining request message to the AMF network element. During specific implementation, the AUMF network element may directly request the AMF network element to obtain the parameter of the first terminal device. In this case, after receiving the parameter obtaining request, the AMF network element immediately obtains the parameter of the first terminal device from the RAN network element and sends the parameter to the AUMF network element.

It should be noted that the foregoing describes this embodiment of this application in detail by using an example in which the AMF network element passively sends the parameter of the first terminal device to the AUMF network element. However, this embodiment of this application is not limited thereto. In another feasible implementation, the AUMF network element may alternatively subscribe to a parameter reporting event from the AMF network element through subscription. When an event trigger condition (for example, registration of the first terminal device) is met, the AMF network element actively reports the parameter of the first terminal device to the AUMF network element.

206. The AMF network element sends the parameter obtaining request message to the RAN network element by using an N2 message.

For example, after receiving the parameter obtaining request message, the AMF network element directly sends the parameter obtaining request message to the RAN network element by using the N2 message. For another example, after receiving the parameter obtaining request message, the AMF network element may process the parameter obtaining request message, and then encapsulate the processed parameter obtaining request message into the N2 message and send the N2 message to the RAN network element.

The process described in steps 205 and 206 is referred to as an event in which the AUMF network element subscribes to a measurement data report from the RAN network element via the AMF network element.

207. The RAN sends the parameter of the first terminal device to the AMF network element by using the N2 message.

208. The AMF network element sends the parameter of the first terminal to the AUMF network element.

In the foregoing steps 207 and 208, the parameter of the first terminal device is, for example, at least one of a quantity of cells detected by the first terminal, a distance between a detected cell and a serving cell, a handover delay, a handover frequency, a handover success rate, a reference signal received power (RSRP), reference signal received quality (RSRQ), a signal to interference plus noise ratio (SINR), or an uplink transmit power.

209. The AUMF determines a type of the first terminal device based on the classification information and the parameter of the first terminal device.

Specifically, for details, refer to the description of step 103 in FIG. 4.

Notification Phase:

210. The AUMF network element sends a notification message to the third-party network element.

If the AUMF network element determines that the first terminal device is an unauthorized terminal device in step 209, in this step, the AUMF network element sends the notification message to the third-party network element, to notify the third-party network element that the first terminal device is the unauthorized terminal device.

Optionally, in this step, the AUMF network element may further carry a fourth request message in the notification message, and send the notification message to the third-party network element, where the fourth request message requests management and control information. After receiving the fourth request message and obtaining the management and control information, the third-party network element performs step 211. When obtaining the management and control information, the third-party network element can obtain the information locally or from an ALEO server.

211. The third-party network element sends the management and control information to the AUMF network element.

Correspondingly, the AUMF network element receives the management and control information.

212. The AUMF network element manages and controls the first terminal device based on the management and control information.

In the foregoing steps 211 and 212, the management and control information is used to indicate the AUMF network element to disconnect a network connection of the unauthorized terminal device, or the like.

In the embodiment shown in FIG. 5A-1, FIG. 5A-2, and FIG. 5A-3, the classification information classifies the terminal device into the authorized terminal device and the unauthorized terminal device. However, this is not limited in this embodiment of this application. In another feasible implementation, the terminal device may alternatively be classified into an air stationary terminal device, an air flight terminal device, a ground stationary terminal device, or a ground mobile terminal device. For details, refer to FIG. 5B-1, FIG. 5B-2, and FIG. 5B-3.

FIG. 5B-1, FIG. 5B-2, and FIG. 5B-3 are a flowchart of a method for identifying a terminal device applicable to the network architecture shown in FIG. 3 according to another embodiment of this application. Compared with the embodiment in FIG. 4, in this embodiment, an NWDAF network element trains training data to obtain classification information, and an AUMF network element identifies, based on a parameter of a first terminal device and the classification information, the first terminal device, where the classification information is for classifying the terminal device into an air terminal device or a ground terminal device. This embodiment includes the following steps.

Training Phase:

301. A third-party network element sends a second request message to the AUMF network element.

In this step, the third-party network element sends the second request message to the AUMF network element via an NEF network element, or when the third-party network element is in a trusted domain, the third-party network element may directly send the second request message to the AUMF network element. For details of the second request message, refer to the description of the optional embodiment in FIG. 4. Details are not described herein again.

302. The AUMF network element sends a first request message to the NWDAF network element.

Specifically, for details of the first request message, refer to the description of step 101 in FIG. 4.

303. The NWDAF network element trains the training data based on the first request message to obtain the classification information.

In this step, assuming that the first request message carries a training data source, and the training data source is a RAN and an OAM system, a network data analysis network element collects the training data via the RAN network element and the OAM system, and obtains the classification information based on the training data. In the training process, when the training data source does not include the third-party network element such as a UMM network element, the network data analysis network element cannot obtain a transmission feature and/or service feature data that are/is of an authorized terminal device and that are/is stored in the UMM network element. Therefore, the NWDAF network element trains the training data, and the obtained classification information cannot be used to classify the terminal device into an authorized terminal device or an unauthorized terminal device. Instead, the obtained classification information can only be used to classify the terminal device into an air stationary terminal device, an air flight terminal device, a ground stationary terminal device, or a ground mobile terminal device. In addition, in the training process in which the classification information is for classifying the terminal device into the air stationary terminal device, the air flight terminal device, the ground stationary terminal device, or the ground mobile terminal device, a quantity of times of obtaining the training data when an air flight terminal device model is trained is greater than a quantity of times of obtaining the training data when an air stationary terminal device model is trained.

In the training process, the network data analysis network element collects the training data via the RAN network element or the OAM system. The training data provided by the RAN network element or the OAM system is data of a large quantity of terminal devices for training the classification information, each of the terminal devices corresponds to one piece of training data, each piece of training data includes data in a plurality of dimensions (for example, a quantity of cells detected by the terminal device, a distance between a detected cell and a serving cell, a handover delay, a handover frequency, a handover success rate, a reference signal received power (RSRP), reference signal received quality (RSRQ), and a signal to interference plus noise ratio (SINR)), and a type of a terminal device corresponding to each piece of training data is known, where the type of the terminal device may be used as label information of the training data corresponding to the terminal device. That is, each piece of training data has one piece of label information. The network data analysis network element trains the classification information based on the training data and the label information that are provided by the RAN network element or the OAM system. For example, training data of the air flight terminal device is extracted from a large amount of training data based on label information of the air flight terminal device, and the training data is trained to obtain the air flight terminal device model. For another example, training data of the air stationary terminal device is extracted from a large amount of training data based on label information of the air stationary terminal device, and the data is trained to obtain the air stationary terminal device model. For still another example, a ground stationary terminal device model or a ground mobile terminal device model is obtained in a same manner. Then, the NWDAF network element obtains the classification information based on the air flight terminal device model, the air stationary terminal device model, the ground stationary terminal device model, or the ground mobile terminal device model. The classification information can be used to classify an unknown terminal device (for example, the foregoing first terminal device, where the type of the first terminal device is unknown) into the air stationary terminal device, the air flight terminal device, the ground stationary terminal device, or the ground mobile terminal device. In this process, because a core network element (for example, a UDM network element) and the third-party network element can determine the terminal device that trains the classification information, the NWDAF network element may obtain the label information of each piece of training data in the large amount of training data via the core network element (for example, the UDM network element), the third-party network element, or the like. In addition, the NWDAF network element may obtain the label information of each piece of training data in the large amount of training data based on subscription information or a NAS message. This is not limited in this embodiment of this application.

304. The NWDAF network element sends, to the AUMF network element, the classification information used to classify the terminal device into the air stationary terminal device, the air flight terminal device, the ground stationary terminal device, or the ground mobile terminal device.

Correspondingly, the AUMF network element receives the classification information.

Identification Phase:

305. The AUMF network element sends a parameter obtaining request message to an AMF network element, to obtain the parameter of the first terminal device.

In this step, the AUMF network element determines the proper AMF network element based on a supervision area, and then sends the parameter obtaining request message to the AMF network element.

306. The AMF network element sends the parameter obtaining request message to the RAN by using an N2 message.

For example, after receiving the parameter obtaining request message, the AMF network element directly forwards the parameter obtaining request to the RAN network element through an N2 interface. For another example, after receiving the parameter obtaining request message, the AMF network element may process the parameter obtaining request message, and then encapsulate the processed parameter obtaining request message into the N2 message and send the N2 message to the RAN network element.

The process described in steps 305 and 306 is referred to as an event in which the AUMF network element subscribes to a measurement data report from the RAN network element via the AMF network element.

307. The RAN network element obtains the parameter of the first terminal device, and sends the parameter to the AMF network element by using the N2 message.

It should be noted that, when it is identified whether the first terminal device is the air stationary terminal device, the parameter of the first terminal device is obtained for a relatively small quantity of times in this step; or when it is identified whether the first terminal device is the air flight terminal device, the parameter of the first terminal device is obtained for a relatively large quantity of times in this step.

308. The AMF network element sends the parameter of the first terminal to the AUMF network element.

In the foregoing steps 307 and 308, the parameter of the first terminal device is, for example, at least one of a quantity of cells detected by the first terminal, a distance between a detected cell and a serving cell, a handover delay, a handover frequency, a handover success rate, a reference signal received power (RSRP), reference signal received quality (RSRQ), a signal to interference plus noise ratio (SINR), or an uplink transmit power.

309. The AUMF network element determines a type of the first terminal device based on the classification information and the parameter of the first terminal device.

In this step, the classification information includes the air flight terminal device model, the air stationary terminal device model, the ground stationary terminal device model, and the ground mobile terminal device model. When determining the type of the first terminal device based on the air stationary terminal device model and the parameter of the first terminal device that is obtained by the RAN network element in step 307, the AUMF network element can determine whether the first terminal device is the air stationary terminal device. When the AUMF network element determines the type of the first terminal device based on the air flight terminal device model and the parameter of the first terminal device that is obtained by the RAN network element in step 307, and only when the RAN network element obtains the parameter of the first terminal device for a sufficient quantity of times in step 307, for example, obtains the parameter of the first terminal device for 50 times, the AUMF network element can determine, based on the air flight terminal device model and a sufficient quantity of parameters of the first terminal device, whether the first terminal device is the air flight terminal device. Otherwise, if the RAN network element obtains the parameter of the first terminal device for an insufficient quantity of times in step 307, for example, obtains the parameter of the first terminal device for only 20 times, even if the AUMF network element identifies the first terminal device based on the air flight terminal device model, the AUMF network element can identify only whether the first terminal device is the air stationary terminal device, but cannot further identify whether the first terminal device is the air flight terminal device. In other words, when the parameter of the first terminal device cannot be obtained for a sufficient quantity of times in step 307, the air flight terminal device model degrades to the air stationary terminal device model when identifying the first terminal device. Consequently, the AUMF network element cannot accurately identify the type of the first terminal device.

310. The AUMF network element sends a third request message to the third-party network element, to verify whether the first terminal device is the unauthorized terminal device.

If the first terminal device is determined as the air terminal device in step 309, it needs to be further verified whether the air terminal device is the unauthorized terminal device. All authorized terminal devices are registered on the third-party network element, that is, on the UMM network element. Therefore, the AUMF network element may send information such as an identifier of the first terminal device to the third-party network element, to query whether the first terminal device is registered on the third-party network element. If the first terminal device is registered on the third-party network element, the first terminal device is the authorized terminal device; or if the first terminal device is not registered on the third-party network element, the first terminal device is the unauthorized terminal device.

In addition, in this step, if the AUMF network element may identify the first terminal device based on the subscription information or the non-access stratum (NAS) information, the AUMF network element may send the third request message to the UDM network element, to verify whether the first terminal device is the unauthorized terminal device.

Notification Phase:

311. The AUMF network element sends a notification message to the third-party network element.

If the AUMF network element determines, via the third-party network element or the UDM network element, that the first terminal device is the unauthorized terminal device in step 310, in this step, the AUMF network element sends the notification message to the third-party network element, to notify the third-party network element that the first terminal device is the unauthorized terminal device.

Optionally, in this step, the AUMF network element may further carry a fourth request message in the notification message, and send the notification message to the third-party network element, where the fourth request message requests management and control information. After receiving the fourth request message and obtaining the management and control information, the third-party network element performs step 312. When obtaining the management and control information, the third-party network element can obtain the information locally or from an ALEO server.

312. The AUMF network element receives the management and control information.

313. The AUMF network element manages and controls the first terminal device based on the management and control information.

In FIG. 4, FIG. 5A-1, FIG. 5A-2, and FIG. 5A-3, and FIG. 5B-1, FIG. 5B-2, and FIG. 5B-3, the embodiments of this application are described in detail by using an example in which the core network element determines the type of the first terminal device. However, the embodiments of this application are not limited thereto. In another feasible implementation, an access network element, for example, an E-UTRAN network element in a 4G network architecture or a RAN network element in a 5G network architecture, may alternatively determine the type of the first terminal device. Based on the network architecture shown in FIG. 3, the following describes in detail the method in this application by using an example in which the RAN network element determines the type of the first terminal device, that is, the RAN network element identifies the first terminal device. For details, refer to FIG. 6A, FIG. 6B-1, FIG. 6B-2, and FIG. 6B-3, and FIG. 6C-1, FIG. 6C-2, and FIG. 6C-3.

Figure 6A:
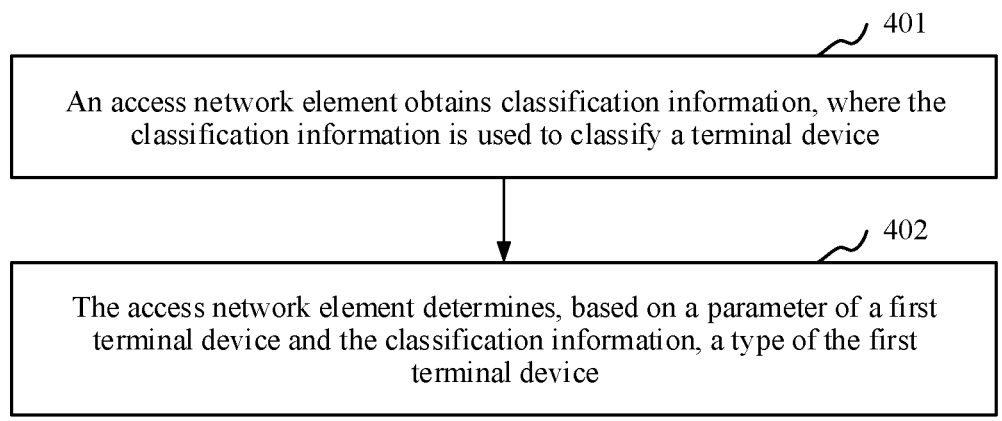
FIG. 6A is a flowchart of a method for identifying a terminal device applicable to the network architecture shown in FIG. 3 according to still another embodiment of this application.
Figures 1, 6B:
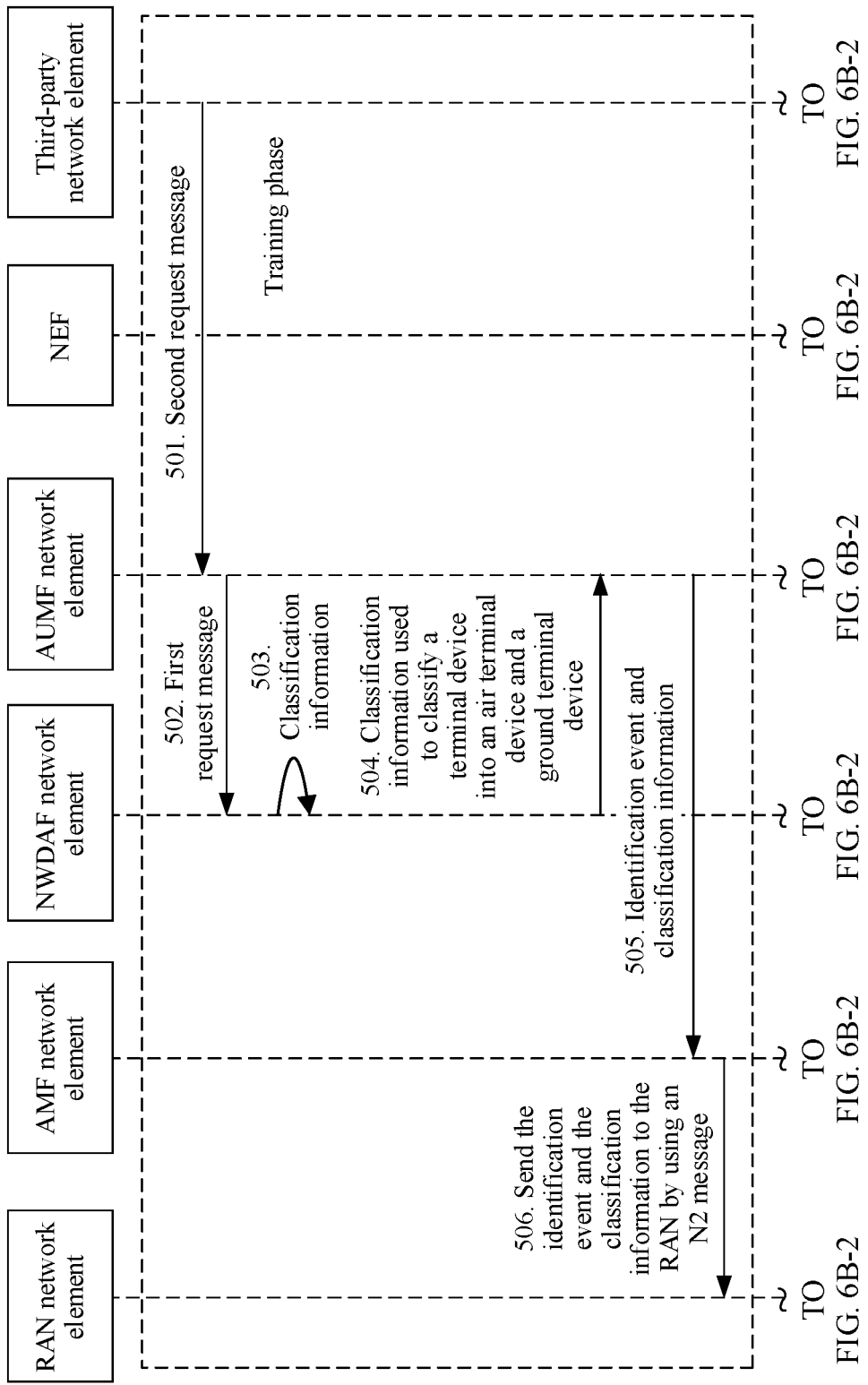
Figures 2, 6B:
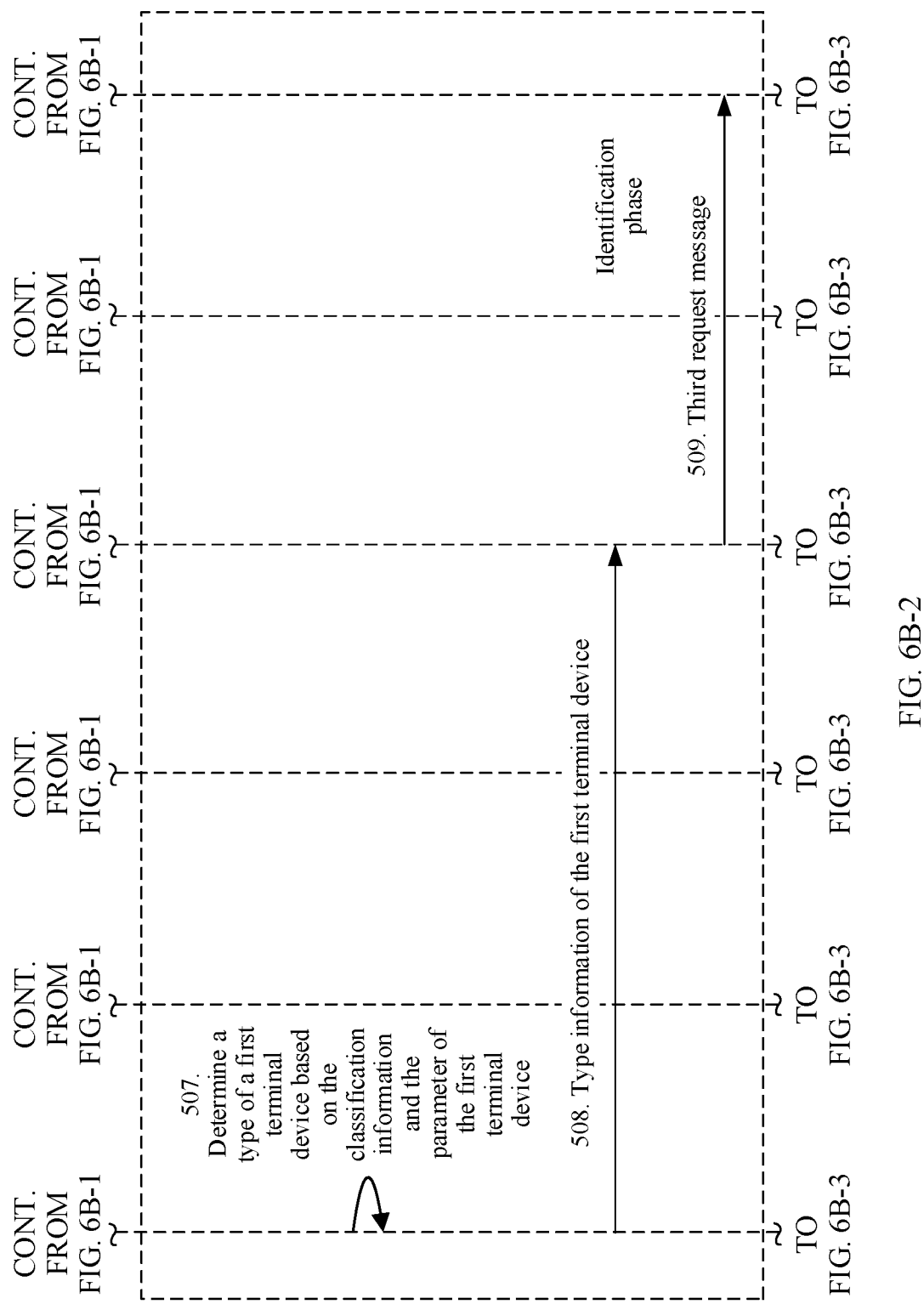
Figures 3, 6B:
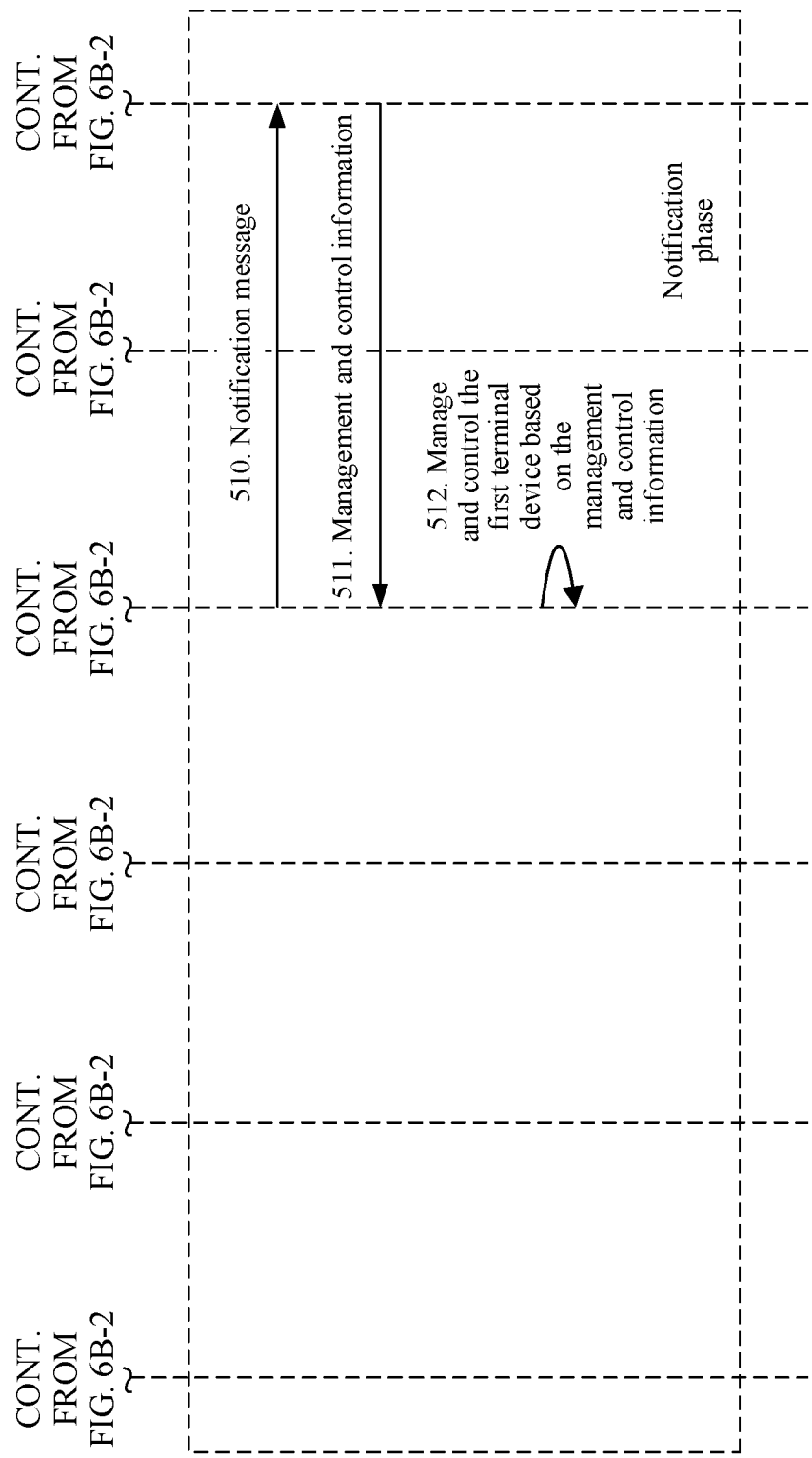
Figures 1, 6C:
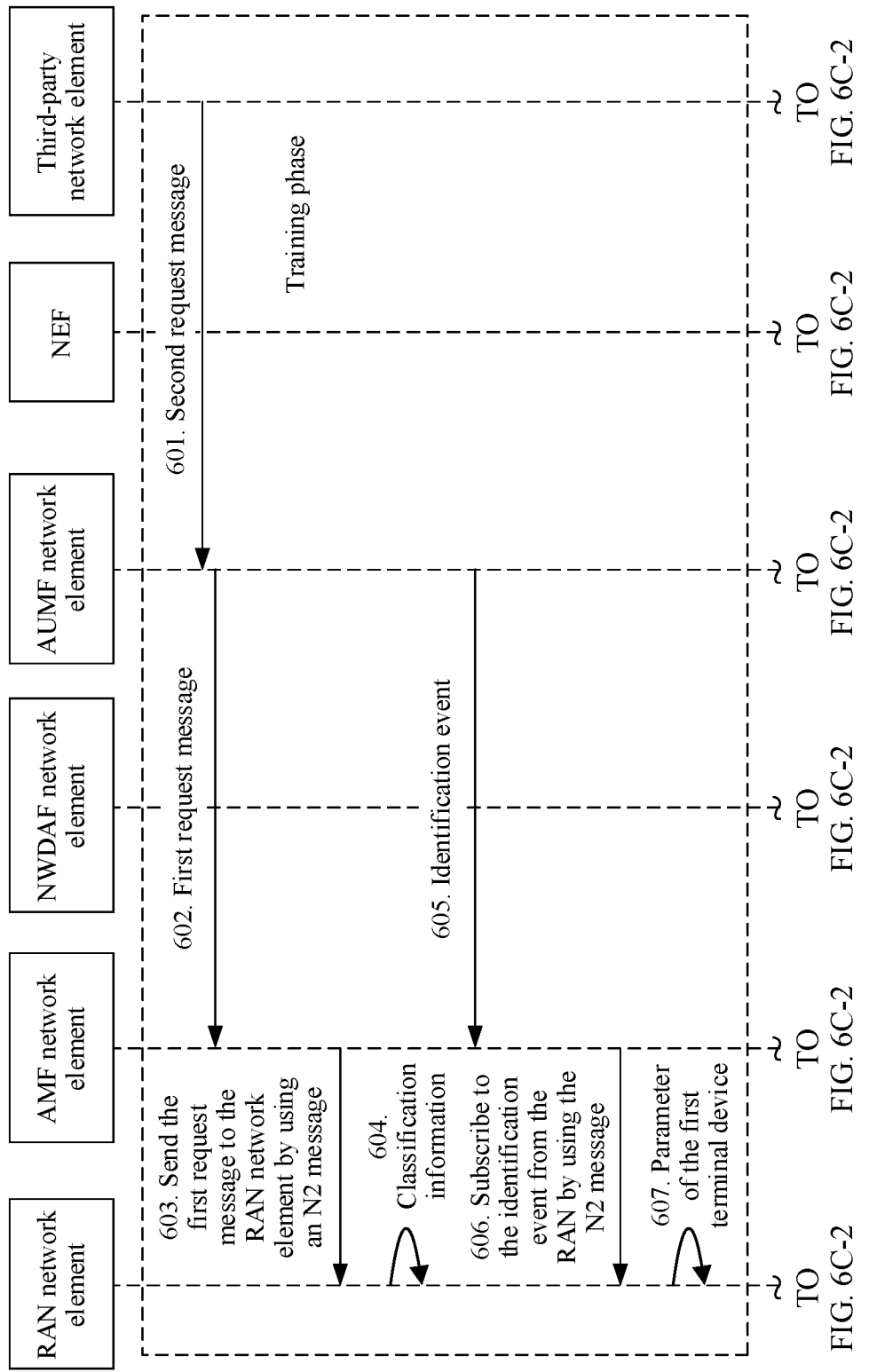

FIG. 6A is a flowchart of a method for identifying a terminal device applicable to the network architecture shown in FIG. 3 according to still another embodiment of this application. Compared with the embodiment in FIG. 4 in which the method in this application is described from a perspective of the core network element, this embodiment of this application is described in detail from a perspective of identifying a first terminal device by an access network element. This embodiment includes the following steps.

401. The access network element obtains classification information, where the classification information is for classifying a terminal device.

402. The access network element determines, based on a parameter of the first terminal device and the classification information, a type of the first terminal device.

According to the method for identifying a terminal device provided in this embodiment of this application, the access network element obtains the classification information used to classify the terminal device, and then determines, based on the classification information and the parameter of the first terminal device, the type of the first terminal device, to identify the first terminal device. In this process, the access network element identifies the first terminal device in a supervision area by using the classification information and the parameter of the first terminal device, to identify a terminal device that is not registered in a supervision system, thereby improving security of the terminal device.

In a feasible implementation, before obtaining the classification information, the access network element further receives a first request message sent by a core network element, where the first request message requests the classification information.

Specifically, the third-party network element is, for example, a UMM network element or an ALEO server disposed in a DN. The UMM network element or the ALEO server sends a second request message to the core network element via a capability open platform, to subscribe to an identification event. During specific implementation, the UMM network element or the ALEO server subscribes to the identification event from the core network element via an NEF network element, or when the third-party network element is in a trusted domain, the third-party network element may directly subscribe to the event from the core network element. After receiving the second request message, the core network element sends the first request message to the access network element, to trigger the access network element to obtain the classification information.

In this embodiment, the access network element receives the first request message sent by the core network element, to trigger the access network element to obtain the classification information, thereby flexibly triggering the access network element to obtain the classification information.

In a feasible implementation, that the access network element obtains the classification information includes: The access network element receives the classification information sent by the core network element; or the access network element locally obtains the classification information.

Specifically, the access network element may obtain the classification information via the core network element, or obtain the classification information via the access network element. When the access network element obtains the classification information via the core network element, the core network element trains training data to obtain the classification information, and sends the classification information to the access network element; or when the access network element obtains the classification information via the access network element, the access network element trains training data to obtain the classification information.

In this embodiment, the access network element receives the classification information sent by the core network element or locally obtains the classification information, thereby flexibly obtaining the classification information.

In a feasible implementation, before the access network element determines, based on the parameter of the first terminal device and the classification information, the type of the first terminal device, the method further includes: The access network element measures the first terminal device to obtain the parameter of the first terminal device; or the access network element receives the parameter reported by the first terminal device.

In a feasible implementation, the parameter of the first terminal device includes at least one of a quantity of detected cells, a distance between a detected cell and a serving cell, a handover delay, a handover frequency, a handover success rate, a reference signal received power (RSRP), reference signal received quality (RSRQ), a signal to interference plus noise ratio (SINR), or an uplink transmit power.

FIG. 6B-1, FIG. 6B-2, and FIG. 6B-3 are a flowchart of a method for identifying a terminal device applicable to the network architecture shown in FIG. 3 according to still another embodiment of this application. Compared with the embodiment in FIG. 4 in which the method in this application is described in detail from a perspective of identifying the first terminal device by the core network element, this embodiment of this application is described in detail from a perspective of identifying a first terminal device by an access network element (a RAN network element). In this embodiment, an NWDAF trains training data to obtain classification information, and the RAN network element identifies, based on a parameter of the first terminal device and the classification information, the first terminal device. The classification information is for classifying the terminal device into an air stationary terminal device, an air flight terminal device, a ground stationary terminal device, or a ground mobile terminal device. This embodiment includes the following steps.

Training Phase:

501. A third-party network element sends a second request message to an AUMF network element.

In this step, the third-party network element sends the second request message to the AUMF network element via an NEF network element, or when the third-party network element is in a trusted domain, the third-party network element may directly send the second request message to the AUMF network element. For details of the second request message, refer to the description of the optional embodiment in FIG. 4. Details are not described herein again.

502. The AUMF network element sends a first request message to the NWDAF network element.

Specifically, for details of the first request message, refer to the description of step 101 in FIG. 4.

503. The NWDAF network element trains the training data based on the first request message to obtain the classification information.

In this step, assuming that the first request message carries a training data source, and the training data source is the RAN and an OAM system, a network data analysis network element collects the training data via the RAN network element and the OAM system, and obtains the classification information based on the training data. In the training process, when the training data source does not include the third-party network element such as a UMM network element, the network data analysis network element cannot obtain a transmission feature and/or service feature data that are/is of an authorized terminal device and that are/is stored in the UMM network element. Therefore, the NWDAF network element trains the training data, and the obtained classification information cannot be used to classify the terminal device into an authorized terminal device or an unauthorized terminal device. Instead, the obtained classification information can only be used to classify the terminal device into the air stationary terminal device, the air flight terminal device, the ground stationary terminal device, or the ground mobile terminal device. In addition, in the training process in which the classification information is for classifying the terminal device into the air stationary terminal device, the air flight terminal device, the ground stationary terminal device, or the ground mobile terminal device, a quantity of times of obtaining the training data when an air flight terminal device model is trained is greater than a quantity of times of obtaining the training data when an air stationary terminal device model is trained.

504. The NWDAF network element sends, to the AUMF network element, the classification information used to classify the terminal device into the air stationary terminal device, the air flight terminal device, the ground stationary terminal device, or the ground mobile terminal device.

Correspondingly, the AUMF network element receives the classification information.

505. The AUMF network element sends an identification event and the classification information to an AMF network element.

In this step, the AUMF network element determines the proper AMF network element based on a supervision area, and then sends the identification event and the classification information to the RAN network element via the AMF network element. The identification event is used to trigger the RAN network element to actively identify a type of the first terminal device.

In this embodiment, an example in which the AUMF network element sends the identification event to the RAN network element via the AMF network element, to trigger the RAN network element to identify the first terminal device is used. However, this embodiment of this application is not limited thereto. In another feasible implementation, the RAN network element reads configuration information, to trigger, based on the configuration information, the RAN network element to identify the first terminal device. The configuration information is used to indicate the RAN network element to obtain the type of the first terminal device. During specific implementation, the configuration information may be locally preconfigured in the RAN network element, or the configuration information may be sent by a core network element (for example, a PCF network element or a UDM network element) to the RAN network element.

506. The AMF network element sends the identification event and the classification information to the RAN by using an N2 message.

For example, after receiving the identification event and the classification information, the AMF network element directly forwards the identification event and the classification information to the RAN network element through an N2 interface. For another example, after receiving the identification event and the classification information, the AMF network element may process the identification event and the classification information, and then encapsulate the processed identification event and the processed classification information into the N2 message and send the N2 message to the RAN network element.

Identification Phase:

507. The RAN network element determines, based on the classification information and a parameter of the first terminal device, the type of the first terminal device.

In this step, the RAN network element obtains the parameter of the first terminal device, and determines, based on the parameter of the first terminal device and the classification information, the type of the first terminal device.

In a feasible implementation, after receiving the identification event, the RAN network element measures the first terminal device to obtain the parameter of the first terminal device. In another feasible implementation, the first terminal device actively reports the parameter to the RAN network element.

508. The RAN network element sends type information to the AUMF network element, where the type information is used to indicate the type of the first terminal device.

509. The AUMF network element sends a third request message to the third-party network element, to verify whether the first terminal device is an unauthorized terminal device.

If the RAN network element determines that the first terminal device is an air terminal device in step 507, it needs to be further verified whether the air terminal device is the unauthorized terminal device. All authorized terminal devices are registered on the third-party network element, that is, on the UMM network element. Therefore, the RAN network element may send the type information of the first terminal device to the AUMF network element, and the AUMF network element further sends information such as an identifier of the first terminal device to the third-party network element, to query whether the first terminal device is registered on the third-party network element. If the first terminal device is registered on the third-party network element, the first terminal device is an authorized terminal device; or if the first terminal device is not registered on the third-party network element, the first terminal device is the unauthorized terminal device.

In addition, in this step, if the AUMF network element may identify the first terminal device based on subscription information or non-access stratum (NAS) information, the AUMF network element may send the third request message to the UDM network element, to verify whether the first terminal device is the unauthorized terminal device.

Notification Phase:

510. The AUMF network element sends a notification message to the third-party network element.

If the AUMF network element determines, via the third-party network element or the UDM network element, that the first terminal device is the unauthorized terminal device in step 310, in this step, the AUMF network element sends the notification message to the third-party network element, to notify the third-party network element that the first terminal device is the unauthorized terminal device.

Optionally, in this step, the AUMF network element may further carry a fourth request message in the notification message, and send the notification message to the third-party network element, where the fourth request message requests management and control information. After receiving the fourth request message and obtaining the management and control information, the third-party network element performs step 511. When obtaining the management and control information, the third-party network element can obtain the information locally or from an ALEO server.

511. The third-party network element sends the management and control information to the AUMF network element.

Correspondingly, the AUMF network element receives the management and control information.

512. The AUMF network element manages and controls the first terminal device based on the management and control information.

FIG. 6C-1, FIG. 6C-2, and FIG. 6C-3 are a flowchart of a method for identifying a terminal device applicable to the network architecture shown in FIG. 3 according to still another embodiment of this application. Compared with the embodiment in FIG. 4 in which the first terminal device is identified by the core network element, this embodiment of this application is described in detail from a perspective of identifying a first terminal device by an access network element (a RAN network element). In this embodiment, the RAN network element trains training data to obtain classification information, and the RAN network element identifies, based on a parameter of the first terminal device and the classification information, the first terminal device. The classification information is for classifying the terminal device into an air terminal device or a ground terminal device. This embodiment includes the following steps.

Training Phase:

601. A third-party network element sends a second request message to an AUMF network element.

In this step, the third-party network element sends the second request message to the AUMF network element via an NEF network element, or when the third-party network element is in a trusted domain, the third-party network element may directly send the second request message to the AUMF network element. For details of the second request message, refer to the description of the optional embodiment in FIG. 4. Details are not described herein again.

602. The AUMF network element sends a first request message to an AMF network element.

Specifically, for details of the first request message, refer to the description of step 101 in FIG. 4.

603. The AMF network element sends the first request message to the RAN network element by using an N2 message.

For example, after receiving the first request message, the AMF network element directly forwards the first request message to the RAN network element through an N2 interface. For another example, after receiving the first request message, the AMF network element may process the first request message, and then encapsulate the processed first request message into the N2 message and send the N2 message to the RAN network element.

604. The RAN network element trains the training data based on the first request message to obtain the classification information.

In this step, assuming that the first request message carries a training data source, and the training data source is the RAN and an OAM system, a network data analysis network element collects the training data via the RAN network element and the OAM system, and obtains the classification information based on the training data. In the training process, when the training data source does not include the third-party network element such as a UMM network element, the network data analysis network element cannot obtain a transmission feature and/or service feature data that are/is of an authorized terminal device and that are/is stored in the UMM network element. Therefore, the NWDAF network element trains the training data, and the obtained classification information cannot be used to classify the terminal device into an authorized terminal device or an unauthorized terminal device. Instead, the obtained classification information can only be used to classify the terminal device into an air stationary terminal device, an air flight terminal device, a ground stationary terminal device, or a ground mobile terminal device. In addition, in the training process in which the classification information is for classifying the terminal device into the air stationary terminal device, the air flight terminal device, the ground stationary terminal device, or the ground mobile terminal device, a quantity of times of obtaining the training data when an air flight terminal device model is trained is greater than a quantity of times of obtaining the training data when an air stationary terminal device model is trained.

605. The AUMF network element sends an identification event to the AMF network element.

In this step, the AUMF network element determines the proper AMF network element based on a supervision area, and then sends the identification event to the RAN network element via the AMF network element. The identification event is used to trigger the RAN network element to actively identify a type of the first terminal device.

In this embodiment, an example in which the AUMF network element sends the identification event to the RAN network element via the AMF network element, to trigger the RAN network element to identify the first terminal device is used. However, this embodiment of this application is not limited thereto. In another feasible implementation, the RAN network element reads configuration information, to trigger, based on the configuration information, the RAN network element to identify the first terminal device. The configuration information is used to indicate the RAN network element to obtain the type of the first terminal device. During specific implementation, the configuration information may be locally preconfigured in the RAN network element, or the configuration information may be sent by a core network element (for example, a PCF network element or a UDM network element) to the RAN network element.

606. The AMF network element sends the identification event to the RAN network element by using the N2 message.

For example, after receiving the identification event, the AMF network element directly forwards the identification event to the RAN network element through an N2 interface. For another example, after receiving the identification event, the AMF network element may process the identification event, and then encapsulate the processed identification event into the N2 message and send the N2 message to the RAN network element.

607. The RAN network element obtains the parameter of the first terminal device.

It should be noted that in 606 and 607, this embodiment of this application is described in detail by using an example in which the RAN network element obtains the parameter of the first terminal device after receiving the identification event subscribed by the AUMF network element. However, this is not limited in this embodiment of this application. In another feasible implementation, the first terminal device may actively report the parameter of the first terminal device to the RAN network element.

Identification Phase:

608. The RAN network element determines, based on the classification information and the parameter of the first terminal device, the type of the first terminal device.

609. The RAN network element sends type information to the AUMF network element, where the type information is used to indicate the type of the first terminal device.

610. The AUMF network element sends a third request message to the third-party network element, to verify whether the first terminal device is an unauthorized terminal device.

If the RAN network element determines that the first terminal device is an air terminal device in step 608, it needs to be further verified whether the air terminal device is the unauthorized terminal device. All authorized terminal devices are registered on the third-party network element, that is, on the UMM network element. Therefore, the RAN network element may send the type information of the first terminal device to the AUMF network element, and the AUMF network element further sends information such as an identifier of the first terminal device to the third-party network element, to query whether the first terminal device is registered on the third-party network element. If the first terminal device is registered on the third-party network element, the first terminal device is an authorized terminal device; or if the first terminal device is not registered on the third-party network element, the first terminal device is the unauthorized terminal device.

In addition, in this step, if the AUMF network element may identify the first terminal device based on subscription information or non-access stratum (NAS) information, the AUMF network element may send the third request message to the UDM network element, to verify whether the first terminal device is the unauthorized terminal device.

Notification Phase:

611. The AUMF network element sends a notification message to the third-party network element.

If the AUMF network element determines, via the third-party network element or the UDM network element, that the first terminal device is the unauthorized terminal device in step 610, in this step, the AUMF network element sends the notification message to the third-party network element, to notify the third-party network element that the first terminal device is the unauthorized terminal device.

Optionally, in this step, the AUMF network element may further carry a fourth request message in the notification message, and send the notification message to the third-party network element, where the fourth request message requests management and control information. After receiving the fourth request message and obtaining the management and control information, the third-party network element performs step 612. When obtaining the management and control information, the third-party network element can obtain the information locally or from an ALEO server.

612. The third-party network element sends the management and control information to the AUMF network element.

Correspondingly, the AUMF network element receives the management and control information.

613. The AUMF network element manages and controls the first terminal device based on the management and control information.

It should be noted that the core network element, that is, the AUMF network element, is newly added to the network architecture shown in FIG. 3. However, this is not limited in this embodiment of this application. In another feasible implementation, no core network element may be added. In other words, there is no core network element that is specifically responsible for identifying the first terminal device in the network architecture, and an existing core network element, for example, an NEF network element, a PCF network element, or an NWDAF network element, is responsible for a function for which the AUMF network element is responsible. Specifically, FIG. 7 is a schematic diagram of a 5G network architecture to which a method for identifying a terminal device is applicable according to still another embodiment of this application.

Referring to FIG. 3, the NWDAF network element is added to the network architecture, the UMM network element and the ALEO network element are disposed in the DN, and the AUMF network element in the network architecture is responsible for identifying the first terminal device. Correspondingly, in FIG. 7, because there is no dedicated core network element responsible for identifying the first terminal device, a function of the AUMF network element may be performed by the existing core network element. For example, a function that the AUMF receives the second request message sent by the third-party network element may be performed by the NEF network element, the PCF network element, or the NWDAF network element. For another example, a function that the AUMF network element determines the type of the first terminal device based on the classification information and the parameter of the first terminal device may be performed by the NWDAF network element, the PCF network element, or the NEF network element. For another example, a function that the AUMF network element further sends the third request message to the third-party network element or the UDM network element when determining that the first terminal device is the air terminal device may be performed by the NWDAF network element, the PCF network element, or the NEF network element. For another example, a function that the AUMF network element sends the fourth request message to the third-party network element to obtain the management and control information when determining that the first terminal device is the unauthorized terminal device may be performed by the NWDAF network element, the PCF network element, or the NEF network element.

Figure 7:
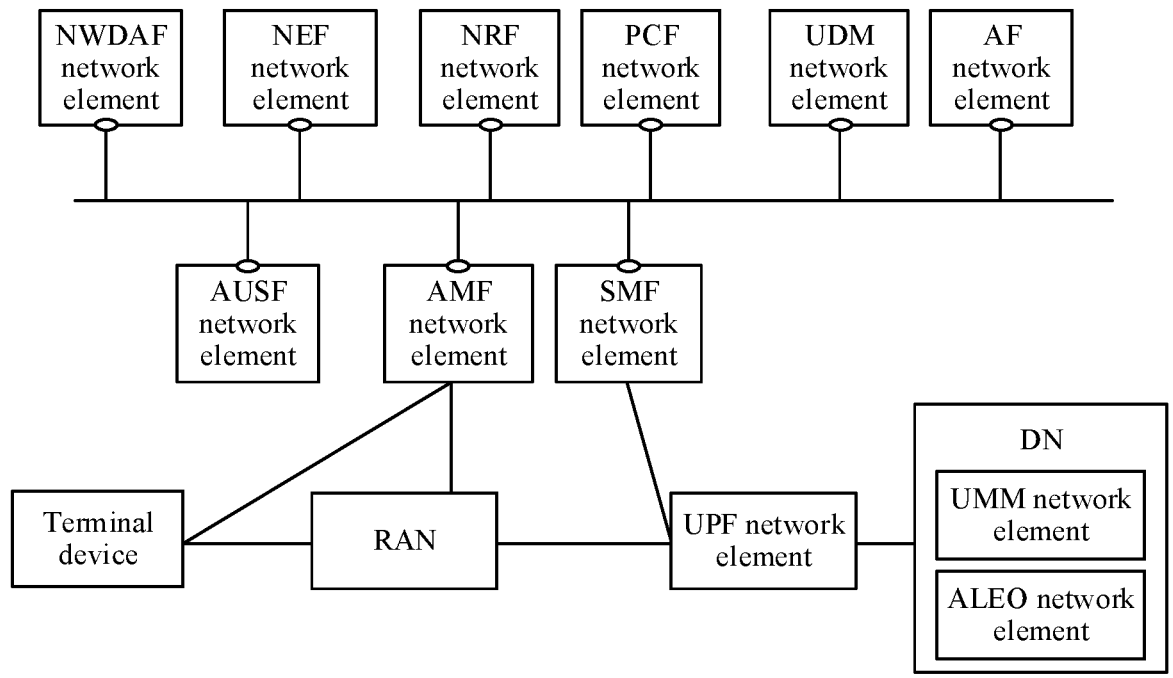
FIG. 7 is a schematic diagram of a 5G network architecture to which a method for identifying a terminal device is applicable according to still another embodiment of this application.

In the network architecture corresponding to FIG. 7, for the method in this embodiment of this application, refer to descriptions of FIG. 3 to FIG. 6C-1, FIG. 6C-2, and FIG. 6C-3. Specifically, an operation of a corresponding network element in FIG. 3 is replaced with an operation of a network element in FIG. 7. For example, if the NEF network element in FIG. 7 has a function of the AUMF network element in FIG. 3, an operation of the AUMF network element in FIG. 3 to FIG. 6C-1, FIG. 6C-2, and FIG. 6C-3 is replaced with an operation of the NEF network element in FIG. 7.

It should be noted that, in both FIG. 3 and FIG. 7, the UMM network element is used as the third-party network element and disposed in the DN. However, this is not limited in this embodiment of this application. In another feasible implementation, the UMM network element may alternatively be disposed on a core network side. Specifically, FIG. 8 is a schematic diagram of a 5G network architecture to which a method for identifying a terminal device is applicable according to still another embodiment of this application.

Figure 8:
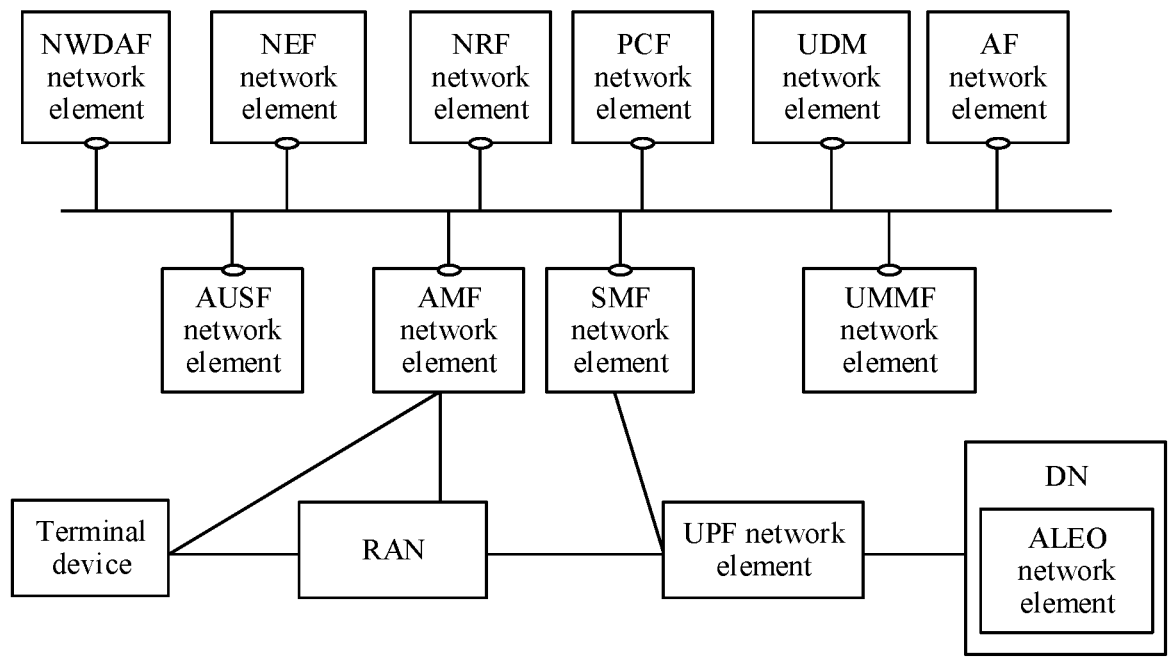
FIG. 8 is a schematic diagram of a 5G network architecture to which a method for identifying a terminal device is applicable according to still another embodiment of this application.

Referring to FIG. 8, in this network architecture, an unmanned monitoring and management function (UMMF) network element is added on a core network side. The UMM network element is changed from a third-party network element to a new core network element, that is, the UMMF network element. Therefore, in this network architecture, no third-party network element is required to provide data. After determining that a first terminal device is an air terminal device, the first terminal device does not need to be checked via the third-party network element, but is directly queried from the UMMF network element or the UDM network element. The UMMF network element stores a database of an authorized terminal device. In addition, after it is determined that the first terminal device is the air terminal device, management and control information does not need to be obtained from the third-party network element, but an unauthorized terminal device is managed and controlled based on the management and control information of the UMMF network element.

In the network architecture corresponding to FIG. 8, for the method in this embodiment of this application, refer to descriptions of FIG. 3 to FIG. 6C-1, FIG. 6C-2, and FIG. 6C-3. Specifically, an operation of a corresponding network element in FIG. 3 is replaced with an operation of a network element in FIG. 8. For example, an NEF network element in FIG. 8 has a function of the AUMF network element in FIG. 3, and the UMMF network element has a function of the UMM network element. In this case, an operation of the AUMF network element in FIG. 3 to FIG. 6C-1, FIG. 6C-2, and FIG. 6C-3 is replaced with an operation of the NEF network element in FIG. 8, and an operation of the UMM network element in FIG. 3 to FIG. 6C-1, FIG. 6C-2, and FIG. 6C-3 is replaced with an operation of the UMMF network element in FIG. 8.

Figure 9:
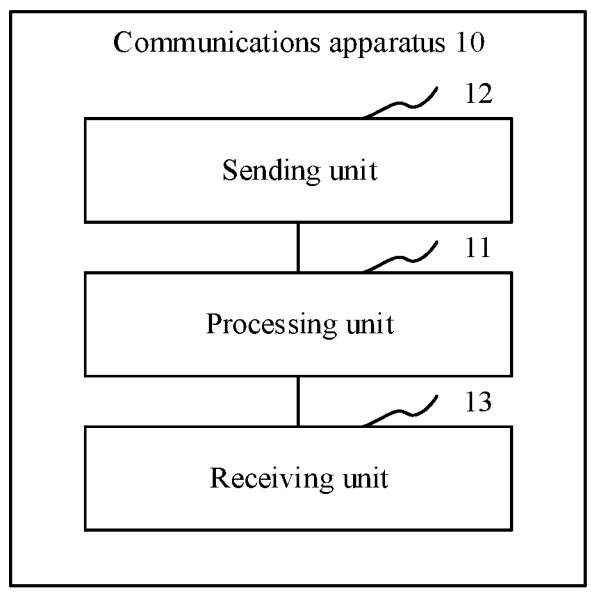
FIG. 9 is a schematic structural diagram of a communications apparatus according to an embodiment of this application.

FIG. 9 is a schematic structural diagram of a communications apparatus according to an embodiment of this application. The communications apparatus in this embodiment may be the foregoing core network element, or may be a chip used in the core network element. The communications apparatus may be configured to perform actions of the core network element in the method embodiments in FIG. 4 to FIG. 5B-1, FIG. 5B-2, and FIG. 5B-3. As shown in FIG. 9, the communications apparatus 10 may include:

a processing unit 11, configured to obtain classification information, and determine, based on a parameter of a first terminal device and the classification information, a type of the first terminal device, where the classification information is for classifying a terminal device.

Referring to FIG. 9, in a feasible implementation, the communications apparatus further includes:
a sending unit 12, configured to send a first request message to a network data analysis network element, where the first request message requests the classification information; and
a receiving unit 13, configured to receive the classification information sent by the network data analysis network element.

In a feasible implementation, the apparatus further includes:
the receiving unit 13, further configured to receive a second request message sent by a third-party network element, where the second request message requests the type of the first terminal device; and
the sending unit 12, further configured to send a response message to the third-party network element, where the response message includes type information of the first terminal device.

In a feasible implementation, the second request message includes one or more of the following information: identification information of the first terminal device, supervision area information, and an identification precision requirement.

In a feasible implementation, the first request message includes one or more of the following information: the identification precision requirement, a training data source, a training data type, and a training model type.

In a feasible implementation, the processing unit 11 is further configured to obtain the parameter of the first terminal device.

In a feasible implementation, the processing unit 11 is specifically configured to receive the parameter of the first terminal device that is sent by a network side network element; or
the processing unit 11 is specifically configured to receive the parameter of the first terminal device that is sent by the third-party network element.

In a feasible implementation, the parameter of the first terminal device that is sent by the network side network element includes at least one of a quantity of detected cells, a distance between a detected cell and a serving cell, a handover delay, a handover frequency, a handover success rate, a reference signal received power RSRP, reference signal received quality RSRQ, a signal to interference plus noise ratio SINR, or an uplink transmit power; and
the parameter of the first terminal device that is sent by the third-party network element includes a transmission feature and/or service feature data.

In a feasible implementation, the classification information is for classifying the terminal device into an authorized terminal device or an unauthorized terminal device.

In a feasible implementation, the classification information is for classifying the terminal device into a ground terminal device or an air terminal device.

In a feasible implementation, if the processing unit 11 determines that the first terminal device is the air terminal device, the sending unit 12 is configured to send a third request message to a unified data management (UDM) network element or the third-party network element, where the third request message is used to verify whether the first terminal device is the unauthorized terminal device.

In a feasible implementation, when the first terminal device is the unauthorized terminal device, the sending unit 12 is configured to send a notification message to the third-party network element, where the notification message is used to indicate to the third-party network element that the first terminal device is the unauthorized terminal device.

The communications apparatus provided in this embodiment of this application may perform the actions of the core network element in the foregoing method embodiment. An implementation principle and a technical effect of the communications apparatus are similar to those of the method embodiment. Details are not described herein again.

Figure 10:
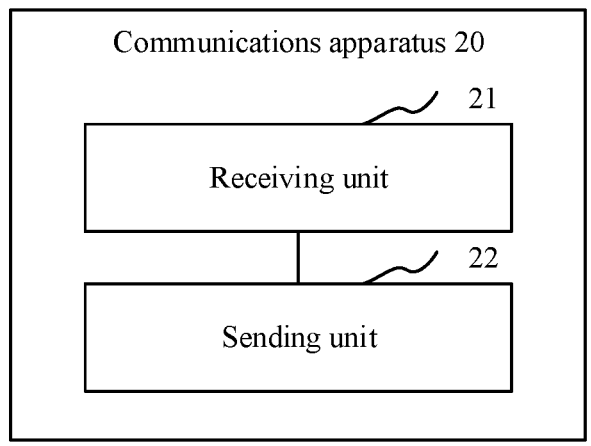
FIG. 10 is a schematic structural diagram of a communications apparatus according to another embodiment of this application.

FIG. 10 is a schematic structural diagram of a communications apparatus according to another embodiment of this application. The communications apparatus in this embodiment may be the foregoing network data analysis network element, or may be a chip used in the network data analysis network element. The communications apparatus may be configured to perform actions of the network data analysis network element in the method embodiments in FIG. 4 to FIG. 6C-1, FIG. 6C-2, and FIG. 6C-3. As shown in FIG. 10, the communications apparatus 20 may include:

a receiving unit 21, configured to receive a first request message sent by a core network element, where the first request message requests classification information, and the classification information is for classifying a terminal device; and a sending unit 22, configured to send the classification information to the core network element.

In a feasible implementation, the first request message includes one or more of the following information: an identification precision requirement, a training data source, a training data type, and a training model type.

In a feasible implementation, the classification information is for classifying the terminal device into an authorized terminal device or an unauthorized terminal device.

In a feasible implementation, the classification information is for classifying the terminal device into a ground terminal device or an air terminal device.

The communications apparatus provided in this embodiment of this application may perform the actions of the network data analysis network element in the foregoing method embodiment. An implementation principle and a technical effect of the communications apparatus are similar to those of the method embodiment. Details are not described herein again.

Figure 11:
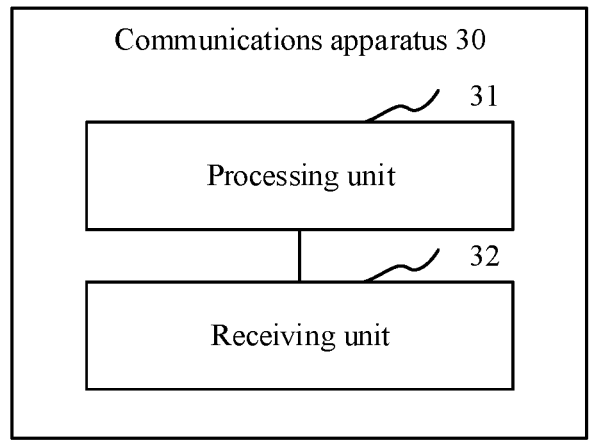
FIG. 11 is a schematic structural diagram of a communications apparatus according to still another embodiment of this application.

FIG. 11 is a schematic structural diagram of a communications apparatus according to still another embodiment of this application. The communications apparatus in this embodiment may be the foregoing access network element, or may be a chip used in the access network element. The communications apparatus may be configured to perform actions of the access network element in the method embodiments in FIG. 6A to FIG. 6C-1, FIG. 6C-2, and FIG. 6C-3. As shown in FIG. 11, the communications apparatus 30 may include:

a processing unit 31, configured to obtain classification information, and determine, based on a parameter of a first terminal device and the classification information, a type of the first terminal device, where the classification information is for classifying a terminal device.

Referring to FIG. 11, in a feasible implementation, the communications apparatus further includes:

a receiving unit 32, configured to receive a first request message sent by a core network element, where the first request message requests the type of the first terminal device.

In a feasible implementation, when obtaining the classification information, the processing unit 31 is specifically configured to receive the classification information sent by the core network element; or when obtaining the classification information, the processing unit 31 is specifically configured to locally obtain the classification information.

In a feasible implementation, the processing unit 31 is further configured to measure the first terminal to obtain the parameter of the first terminal device; or the processing unit 31 is configured to receive the parameter reported by the first terminal device.

In a feasible implementation, the parameter of the first terminal device includes at least one of a quantity of detected cells, a distance between a detected cell and a serving cell, a handover delay, a handover frequency, a handover success rate, a reference signal received power (RSRP), reference signal received quality (RSRQ), a signal to interference plus noise ratio (SINR), or an uplink transmit power.

The communications apparatus provided in this embodiment of this application may perform the actions of the access network element in the foregoing method embodiment. An implementation principle and a technical effect of the communications apparatus are similar to those of the method embodiment. Details are not described herein again.

It should be noted that, it should be understood that the receiving unit may be a receiver during actual implementation, and the sending unit may be a transmitter during actual implementation. The processing unit may be implemented in a form of software invoked by a processing element, or may be implemented in a form of hardware. For example, the processing unit may be a separately disposed processing element, or may be integrated into a chip of the foregoing apparatus for implementation. In addition, the processing unit may be stored in a memory of the foregoing apparatus in a form of program code, and is invoked by a processing element of the foregoing apparatus to perform a function of the processing unit. In addition, all or some of the units may be integrated together, or may be implemented independently. The processing element described herein may be an integrated circuit with a signal processing capability. In an implementation process, steps of the foregoing method or the foregoing units may be implemented by using an integrated logic circuit of hardware in the processor element, or by using an instruction in a form of software.

For example, the foregoing units may be configured as one or more integrated circuits for implementing the method, for example, one or more application-specific integrated circuits (ASIC), one or more microprocessors (DSP), or one or more field programmable gate arrays (FPGA). For another example, when a unit is implemented by scheduling program code by a processing element, the processing element may be a general-purpose processor, for example, a central processing unit (CPU) or another processor that can invoke the program code. For still another example, the units may be integrated and implemented in a form of a system-on-a-chip (SOC).

Figure 12:
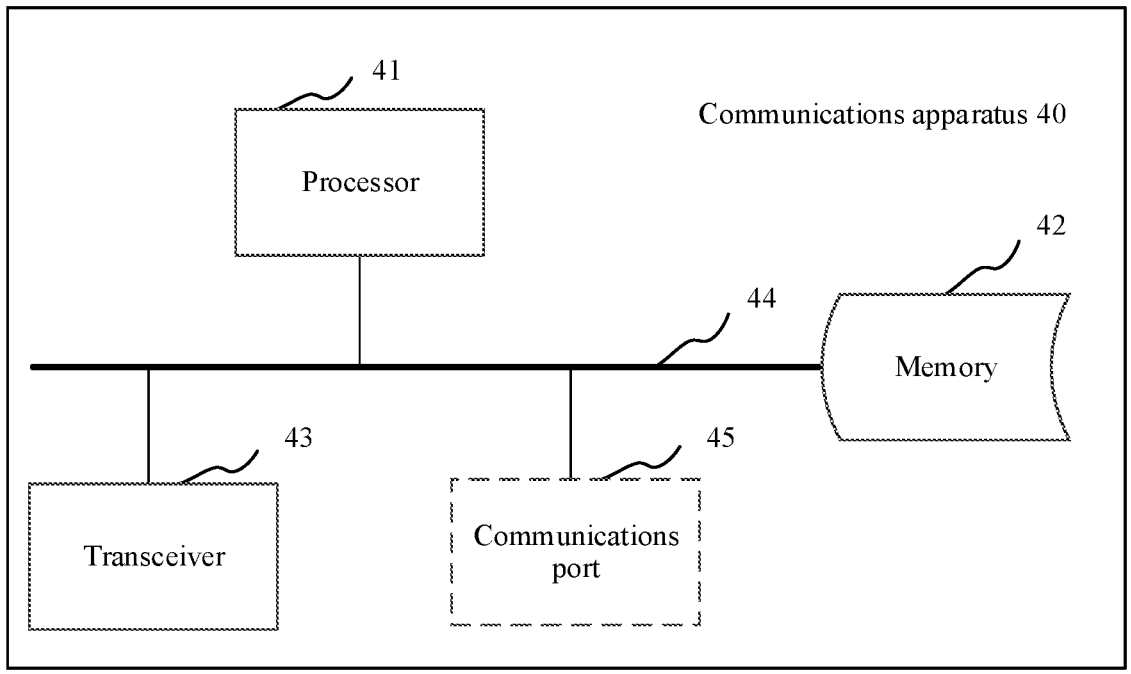
FIG. 12 is a schematic structural diagram of a communications apparatus according to still another embodiment of this application.

FIG. 12 is a schematic structural diagram of a communications apparatus according to still another embodiment of this application. The communications apparatus may be the core network element or the network data analysis network element in FIG. 4 to FIG. 6C-1, FIG. 6C-2, and FIG. 6C-3. As shown in FIG. 12, the communications apparatus 40 may include a processor 41, a memory 42, and a transceiver 43. The transceiver 43 is coupled to the processor 41, and the processor 41 controls a sending and receiving action of the transceiver 43. The memory 42 may include a high-speed random access memory (RAM), and may further include a non-volatile memory (NVM), for example, at least one magnetic disk memory. The memory 42 may store various instructions, to complete various processing functions and implement steps of the method in this application. Optionally, the communications apparatus in this application may further include a communications bus 44 and a communications port 45. The transceiver 43 may be integrated into a transceiver of the communications apparatus, or may be an independent transceiver antenna on the communications apparatus. The communications bus 44 is configured to implement a communication connection between elements. The communications port 45 is configured to implement connection and communication between the communications apparatus and another peripheral.

In this embodiment of this application, when the communications apparatus is the core network element in FIG. 4 to FIG. 6C-1, FIG. 6C-2, and FIG. 6C-3, the memory 42 is configured to store computer-executable program code, and the program code includes an instruction. When the processor 41 executes the instruction, the instruction enables the processor 41 of the communications apparatus to perform processing actions of the core network element in the method embodiments in FIG. 4 to FIG. 6C-1, FIG. 6C-2, and FIG. 6C-3, and enables the transceiver 43 to perform receiving and sending actions of the core network element in the method embodiments in FIG. 4 to FIG. 6C-1, FIG. 6C-2, and FIG. 6C-3. Implementation principles and technical effects thereof are similar. Details are not described herein again. When the communications apparatus is the network data analysis network element in FIG. 4 to FIG. 6C-1, FIG. 6C-2, and FIG. 6C-3, the memory 42 is configured to store computer-executable program code, and the program code includes an instruction. When the processor 41 executes the instruction, the instruction enables the processor 41 of the communications apparatus to perform processing actions of the network data analysis network element in the method embodiments in FIG. 4 to FIG. 6C-1, FIG. 6C-2, and FIG. 6C-3, and enables the transceiver 43 to perform receiving and sending actions of the network data analysis network element in the method embodiments in FIG. 4 to FIG. 6C-1, FIG. 6C-2, and FIG. 6C-3. Implementation principles and technical effects thereof are similar. Details are not described herein again.

Figure 13:
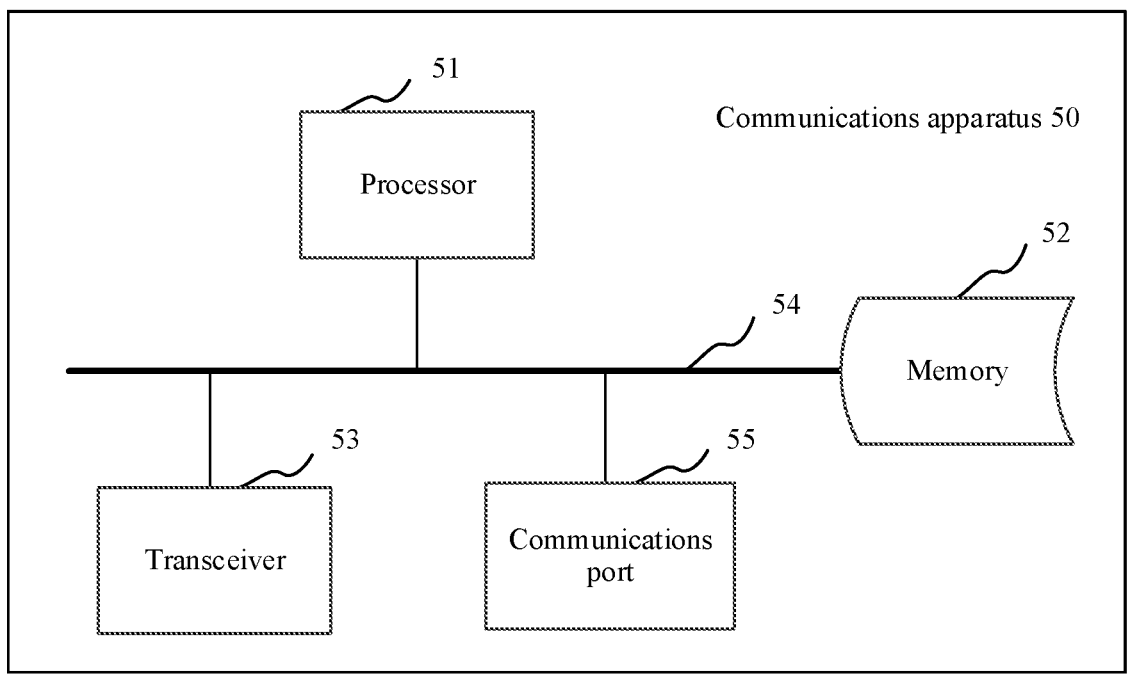
FIG. 13 is a schematic structural diagram of a communications apparatus according to still another embodiment of this application.

FIG. 13 is a schematic structural diagram of a communications apparatus according to still another embodiment of this application. The communications apparatus may be the access network element in FIG. 4 to FIG. 6C. As shown in FIG. 13, the communications apparatus may include a processor 51, a memory 52, and a transceiver 53. The transceiver 53 is coupled to the processor 51, and the processor 51 controls a sending and receiving action of the transceiver 53. The memory 52 may include a high-speed random access memory (RAM), and may further include a non-volatile memory (NVM), for example, at least one magnetic disk memory. The memory 52 may store various instructions, to complete various processing functions and implement steps of the method in this application. Optionally, the communications apparatus in this application may further include a communications bus 54 and a communications port 55. The transceiver 53 may be integrated into a transceiver of the communications apparatus, or may be an independent transceiver antenna on the communications apparatus. The communications bus 54 is configured to implement a communication connection between elements. The communications port 54 is configured to implement connection and communication between the communications apparatus and another peripheral.

In this embodiment of this application, the memory 52 is configured to store computer-executable program code, and the program code includes an instruction. When the processor 51 executes the instruction, the instruction enables the processor 51 of the communications apparatus to perform processing actions of the access network element in the method embodiments in FIG. 4 to FIG. 6C-1, FIG. 6C-2, and FIG. 6C-3, and enables the transceiver 53 to perform receiving and sending actions of the access network element in the method embodiments in FIG. 4 to FIG. 6C-1, FIG. 6C-2, and FIG. 6C-3. Implementation principles and technical effects thereof are similar. Details are not described herein again.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The term "a plurality of" in this specification means two or more than two. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects. In the formula, the character "/" indicates a "division" relationship between the associated objects.

The components in the apparatuses in FIG. 9 to FIG. 13 of this application are in communications connection. To be specific, the processing unit (or the processor), the storage unit (or the memory), and the transceiver unit (the transceiver) communicate with each other through an internal connection path, to transmit a control signal and/or a data signal. The foregoing method embodiments of this application may be used by the processor, or the processor implements the steps in the foregoing method embodiments. The processor may be an integrated circuit chip and has a signal processing capability. In an implementation process, the steps in the foregoing method embodiments may be implemented by using a hardware integrated logic circuit in the processor or an instruction in a form of software. The processor may be a central processing unit (CPU), a network processor (NP), a combination of a CPU and an NP, a digital signal processor (DSP), an application-specific integrated circuit (ASIC), a field programmable gate array (FPGA) or another programmable logic device, a discrete gate or a transistor logic device, or a discrete hardware component.

The processor may implement or perform the methods, the steps, and logical block diagrams that are disclosed in this application. The general-purpose processor may be a microprocessor, or the processor may be any conventional processor or the like. The steps of the methods disclosed with reference to this application may be directly performed and completed by using a hardware decoding processor, or may be performed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with the hardware of the processor. Although only one processor is shown in the figure, the apparatus may include a plurality of processors, or the processor includes a plurality of processing units. Specifically, the processor may be a single-core (single-CPU) processor, or may be a multi-core (multi-CPU) processor.

The memory is configured to store a computer instruction executed by the processor. The memory may be a storage circuit or a memory. The memory may be a volatile memory or a non-volatile memory, or may include both a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. The memory may be independent of the processor, or may be a storage unit in the processor. This is not limited herein. Although only one memory is shown in the figure, the apparatus may alternatively include a plurality of memories, or the memory includes a plurality of storage units.

The transceiver is configured to implement content exchange between the processor and another unit or network element. Specifically, the transceiver may be a communications interface of the apparatus, a transceiver circuit or a communications unit, or a transceiver. The transceiver may alternatively be a communications interface or a transceiver circuit of the processor. Optionally, the transceiver may be a transceiver chip. The transceiver may further include a sending unit and/or a receiving unit. In a possible implementation, the transceiver may include at least one communications interface. In another possible implementation, the transceiver may alternatively be a unit implemented in a form of software. In the embodiments of this application, the processor may interact with another unit or network element through the transceiver. For example, the processor obtains or receives content from another network element through the transceiver. If the processor and the transceiver are two physically separated components, the processor may exchange content with another unit in the apparatus without using the transceiver.

In a possible implementation, the processor, the memory, and the transceiver may be connected to each other through a bus. The bus may be a peripheral component interconnect (PCI) bus, an extended industry standard architecture (EISA) bus, or the like. The bus may be classified into an address bus, a data bus, a control bus, and the like.

In the embodiments of this application, the word "example" or "for example" is used to represent giving an example, an illustration, or a description. Any embodiment or design solution described by using "example" or "for example" in the embodiments of this application shall not be construed as being more preferred or more advantageous than another embodiment or design solution. Exactly, use of the word "example", "for example", or the like is intended to present a related concept in a specific manner.

In the embodiments of this application, for ease of understanding, a plurality of examples are used for description. However, the examples are merely examples, but it does not mean that the examples are optimal implementations for implementing this application.

In the embodiments of this application, for ease of description, names of a request message, a response message, and various other messages are used. However, the messages are merely used as examples to describe content that needs to be carried or an implemented function. Specific names of the messages constitute no limitation to this application. For example, the messages may alternatively be a first message, a second message, a third message, and the like. The messages may be some specific messages, or may be some fields in the messages. The messages may alternatively represent various service operations.

It may be understood that numerical symbols used in the embodiments of this application are differentiated merely for ease of description, but are not used to limit the scope of the embodiments of this application.

It should be understood that sequence numbers of the foregoing processes do not mean execution sequences in the embodiments of this application. The execution sequences of the processes should be determined according to functions and internal logic of the processes, and should not be construed as any limitation on the implementation processes of the embodiments of this application.

What is claimed is:

1. A method, comprising:
    sending, by a network data analysis network element, classification information to a core network element, wherein the classification information is for classifying a terminal device;
    determining, by the core network element based on a parameter of the terminal device and the classification information, indication information that includes at least an identifier of the terminal device and one of:
        information indicating whether the terminal device is an unauthorized terminal device;
        information indicating whether the terminal device is an air terminal device; or
        a list of unauthorized terminal devices; and
    receiving, by the core network element, the parameter of the terminal device from a network side network element; or
    receiving, by the core network element, the parameter of the terminal device from a third-party network element.

2. The method according to claim 1, further comprising:
    sending, by the core network element, a first request message to the network data analysis network element, wherein the first request message requests the classification information; and
    receiving, by the core network element, the classification information from the network data analysis network element.

3. The method according to claim 1, further comprising:
    receiving, by the core network element, a second request message from the third-party network element, wherein the second request message requests the indication information; and sending, by the core network element, a response message to the third-party network element, wherein the response message comprises the indication information.

4. The method according to claim 3, wherein the second request message comprises one or more of the following information: identification information of the terminal device, supervision area information, and an identification precision requirement.

5. The method according to claim 2, wherein the first request message comprises one or more of the following information: an identification precision requirement, a training data source, a training data type, and a training model type.

6. The method according to claim 1, wherein
the parameter of the terminal device received from the network side network element comprises at least one of a quantity of detected cells, a distance between a detected cell and a serving cell, a handover delay, a handover frequency, a handover success rate, a reference signal received power (RSRP), reference signal received quality (RSRQ), a signal to interference plus noise ratio (SINR), or an uplink transmit power; or
the parameter of the terminal device received from the third-party network element comprises at least one of a transmission feature, or service feature data.

7. The method according to claim 1, wherein the classification information classifies the terminal device into an authorized terminal device or an unauthorized terminal device, or classifies the terminal device into a ground terminal device or an air terminal device.

8. The method according to claim 7, wherein responsive to determining that the terminal device is the air terminal device, the method further comprises:
sending, by the core network element, a third request message to a unified data management (UDM) network element or the third-party network element, wherein the third request message is used to verify whether the terminal device is the unauthorized terminal device.

9. The method according to claim 7, wherein responsive to determining that the terminal device is the unauthorized terminal device, the method further comprises:
sending, by the core network element, a notification message to the third-party network element, wherein the notification message indicates to the third-party network element that the terminal device is the unauthorized terminal device.

10. A system, comprising:
a network data analysis network element, configured to send classification information to a core network element, wherein the classification information is for classifying a terminal device; and
the core network element, configured to determine, based on a parameter of the terminal device and the classification information, indication information that includes at least an identifier of the terminal device and one of:
information indicating whether the terminal device is an unauthorized terminal device;
information indicating whether the terminal device is an air terminal device; or
a list of unauthorized terminal devices; and
receive the parameter of the terminal device from a network side network element; or
receive the parameter of the terminal device from a third-party network element.

11. The system according to claim 10, wherein the core network element is further configured to: send a first request message to the network data analysis network element, wherein the first request message requests the classification information; and receive the classification information from the network data analysis network element.

12. The system according to claim 11, wherein the first request message comprises one or more of the following information: an identification precision requirement, a training data source, a training data type, and a training model type.

13. The system according to claim 10, wherein the core network element is further configured to: receive a second request message from the third-party network element, wherein the second request message requests the indication information; and send a response message to the third-party network element, wherein the response message comprises the indication information.

14. The system according to claim 13, wherein the second request message comprises one or more of the following information: identification information of the terminal device, supervision area information, and an identification precision requirement.

15. The system according to claim 10, wherein the classification information classifies the terminal device into an authorized terminal device or an unauthorized terminal device, or classifies the terminal device into a ground terminal device or an air terminal device.

16. The system according to claim 15, wherein the core network element is further configured to send a third request message to a unified data management (UDM) network element or the third-party network element, wherein the third request message verifies that the terminal device is the unauthorized terminal device.

17. The system according to claim 16, wherein responsive to determining that the terminal device is the unauthorized terminal device, the core network element is further configured to send a notification message to the third-party network element, wherein the notification message indicates to the third-party network element that the terminal device is the unauthorized terminal device.

18. An apparatus, comprising:
at least one processor; and
a memory coupled to the at least one processor and storing instructions for execution by the at least one processor, wherein the instructions instruct the at least one processor to cause the apparatus to:
obtain classification information, wherein the classification information classifies a terminal device; and
determine, based on a parameter of the terminal device and the classification information, indication information that includes at least an identifier of the terminal device and one of:
information indicating whether the terminal device is an unauthorized terminal device;
information indicating whether the terminal device is an air terminal device; or
a list of unauthorized terminal devices; and
receive the parameter of the terminal device from a network side network element; or
receive the parameter of the terminal device from a third-party network element.

* * * * *

UNITED STATES PATENT AND TRADEMARK OFFICE
CERTIFICATE OF CORRECTION

PATENT NO. : 11,974,124 B2
APPLICATION NO. : 17/187290
DATED : April 30, 2024
INVENTOR(S) : Haoren Zhu et al.

Page 1 of 1

It is certified that error appears in the above-identified patent and that said Letters Patent is hereby corrected as shown below:

On the Title Page

Column 2, after Item (57) change:
18 claims
To:
20 claims

In the Claims

Column 46, after Claim 18, please add:
-- 19. The apparatus according to claim 18, wherein the instructions further instruct the at least one processor to cause the apparatus to:
send a first request message to a network data analysis network element, wherein the first request message requests the classification information; and
receive the classification information from the network data analysis network element.
20. The system according to claim 18, wherein the instructions further instruct the at least one processor to cause the apparatus to:
receive a second request message from the third-party network element, wherein the second request message requests the indication information; and
send a response message to the third-party network element, wherein the response message comprises the indication information. --

Signed and Sealed this
Twenty-second Day of April, 2025

Coke Morgan Stewart
*Acting Director of the United States Patent and Trademark Office*